Nov. 29, 1966 H. W. McCLARNEY 3,287,782

APPARATUS TO CONSTRUCT MASONRIES

Original Filed Sept. 5, 1963 9 Sheets-Sheet 1

INVENTOR.
HARRY W. McCLARNEY
BY Wm T Wofford
ATTORNEY

APPARATUS TO CONSTRUCT MASONRIES

Original Filed Sept. 5, 1963 9 Sheets-Sheet 2

INVENTOR.
HARRY W. McCLARNEY
BY Wm T Wofford
ATTORNEY

APPARATUS TO CONSTRUCT MASONRIES

Original Filed Sept. 5, 1963 9 Sheets-Sheet 3

INVENTOR.
HARRY W. McCLARNEY
BY Wm. T. Wofford
ATTORNEY

Nov. 29, 1966 H. W. McCLARNEY 3,287,782

APPARATUS TO CONSTRUCT MASONRIES

Original Filed Sept. 5, 1963 9 Sheets-Sheet 4

INVENTOR.
HARRY W. McCLARNEY
BY Wm. T. Wofford
ATTORNEY

APPARATUS TO CONSTRUCT MASONRIES

Original Filed Sept. 5, 1963 9 Sheets-Sheet 5

INVENTOR.
HARRY W. McCLARNEY
BY Wm. T. Wofford
ATTORNEY

INVENTOR.
HARRY W. McCLARNEY
BY Wm. T. Wofford
ATTORNEY

INVENTOR.
HARRY W. McCLARNEY
BY Wm T Wofford
ATTORNEY

Nov. 29, 1966 H. W. McCLARNEY 3,287,782

APPARATUS TO CONSTRUCT MASONRIES

Original Filed Sept. 5, 1963 9 Sheets-Sheet 8

INVENTOR.
HARRY W. McCLARNEY
BY Wm. T. Wofford
ATTORNEY

INVENTOR.
HARRY W. McCLARNEY
BY Wm. T. Wofford
ATTORNEY

United States Patent Office 3,287,782
Patented Nov. 29, 1966

3,287,782
APPARATUS TO CONSTRUCT MASONRIES
Harry W. McClarney, 5621 Westlawn, Waco, Tex.
Original application Sept. 5, 1963, Ser. No. 306,766, now Patent No. 3,210,445, dated Oct. 5, 1965. Divided and this application Oct. 29, 1964, Ser. No. 407,491
14 Claims. (Cl. 25—1)

This application is a division of my co-pending application, U.S. Serial No. 306,766, filed September 5, 1963, and entitled, "Apparatus and Methods To Construct Masonries," now U.S. Patent 3,210,445.

My invention relates to structural masonries and more particularly to improved apparatus to construct masonries. The terms "masonry" or "masonries" are used hereinafter in the general sense of that which is built by a mason; anything constructed of materials, such as stone, brick or tiles, or any other materials used or useable by masons.

A number of efforts have been made in the prior art of which I am aware to in varying degrees mechanize the art of constructing masonries. However, none of these efforts have proved to be successful, with the result that essentially all construction of masonries is still done by hand.

The general object of the present invention is to provide improved apparatus to construct masonries.

An object of the invention is to provide improved apparatus for use in constructing panel sections of masonry.

Another object of the invention is to provide improved apparatus which locates and maintains the units of the masonry in a predetermined uniformly aligned arrangement until cementarily bonded into a common mass.

Another object of the invention is to provide improved apparatus for use in constructing masonries which effectively and importantly reduces the time to construct masonries.

Another object of the invention is to provide improved apparatus for use in constructing masonries that position and maintain the units thereof in positive back and front face alignment until cementarily bonded into a common mass.

Another object of the invention is to provide improved apparatus, for use in constructing masonries, that position and maintain the units of such masonries into both back and front face alignment as well as bottom face alignment until cementarily bonded into a common mass.

Another object of the invention is to provide improved apparatus, for use in constructing masonries, that readily and easily receives units which are placed in position from the front-face side of the finished masonry.

Another object of the invention is to provide apparatus for holding and maintaining units of masonry by their respective front faces in fixed predetermined spaced arrangement until cementarily bonded into a common mass.

Another object of the invention is to provide apparatus for use in simultaneously construction both the inner and outer wall of a structural masonry.

Another object of the invention is to provide apparatus for use in simultaneously constructing both the inner and outer walls of a double-wall type of masonry with different units of masonry in each wall.

Another object of the invention is to provide apparatus, for use in constructing masonries, that admit of varying the pattern and the arrangement of units in such masonry.

These and other objects are effected by my invention as will be apparent from the following description taken in accordance with the accompanying drawings, forming a part of this application, in which.

Figure 1:
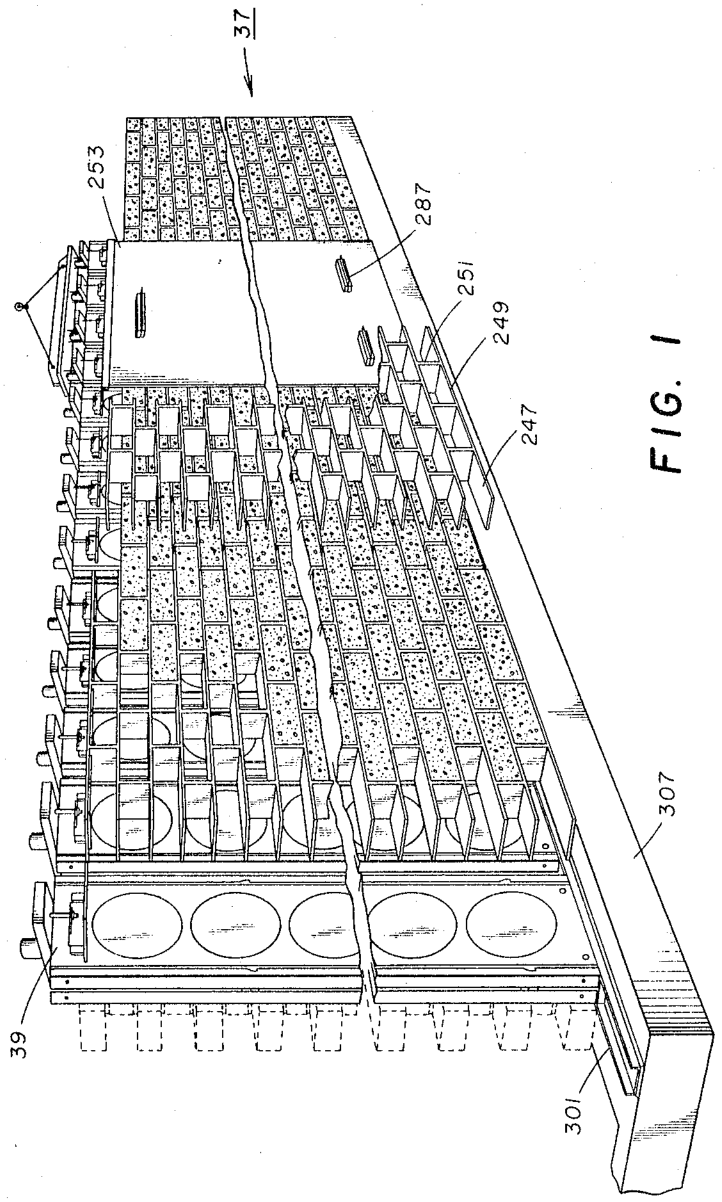
FIG. 1 is a schematic perspective view of a typical masonry constructed in accordance with a method and by means of a preferred form of an apparatus of my invention.

Referring to the drawings, FIG. 1 illustrates, in perspective, one method of constructing a typical masonry 37, which basically comprises a double-walled structure composed of units of masonry that are held together by a cementatory type of bonding substance, using preferred embodiment forms of some of the apparatus of my invention. The apparatus shown in FIG. 1 includes generally such items as a base plate, a plurality of magnetic type of unit holders, a plurality of unit spacing boards or grids, and a plurality of joint form boards. Each such item of apparatus, as well as the method of construction, will be presently described in conjunction with other more detailed figures in the drawings.

I.—*Magnetic unit holder*

Figures 2, 3, 4, 5:
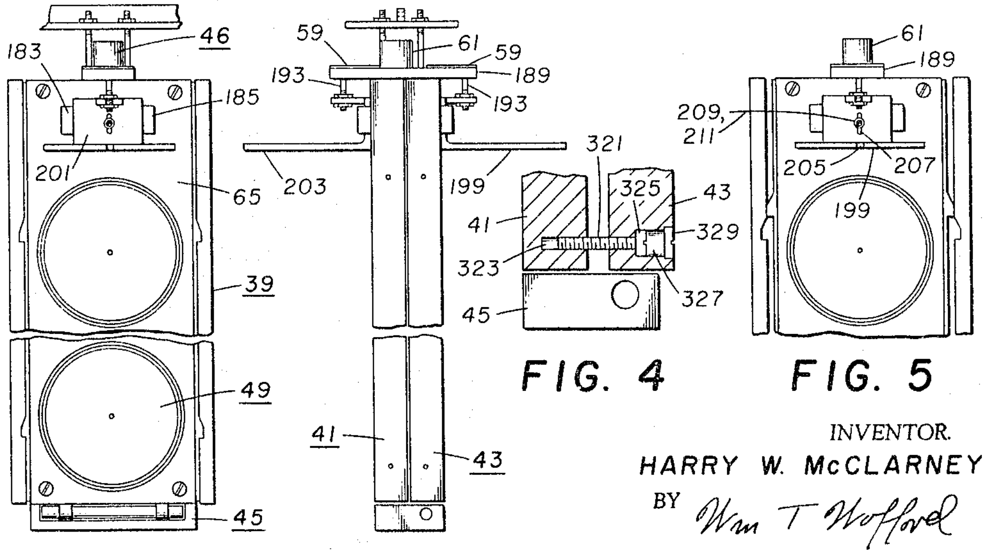
FIG. 2 is a schematic front elevational view of a magnetic type of unit holder.
FIG. 3 is a schematic side elevational view of the magnetic unit holder of FIG. 2.
FIG. 4 is a schematic side elevational view of the lower portion of the magnetic unit holder of FIG. 2, showing same in the expanded position.
FIG. 5 is a schematic front elevational view of the upper portion of the magnetic unit holder of FIG. 2, with the side members thereof in the expanded position.

In FIGS. 2 and 3 there is illustrated the front and side elevational views respectively of one form of a magnetic unit holder 39. The magnetic unit holder 39 basically comprises: a fixed magnet housing 41; a movable magnet housing 43; a magnet housing base portion 45; and a magnetic unit holder control apparatus 46. The fixed magnet housing 41 is delineated in FIG. 6, in an exploded view form, and includes: a magnet housing portion 47; a plurality of electromagnet units 49; left and right side panel members 51, 53 respectively (the left and the right side panel members being on the left and right side respectively of FIG. 6); left and right side panel actuating rods 55, 57, respectively. The magnetic unit holder control apparatus 46 includes a pair of shelf angle actuating cylinders and pistons 59, and a side panels and housing actuating cylinder and piston 61.

Figures 6, 15:
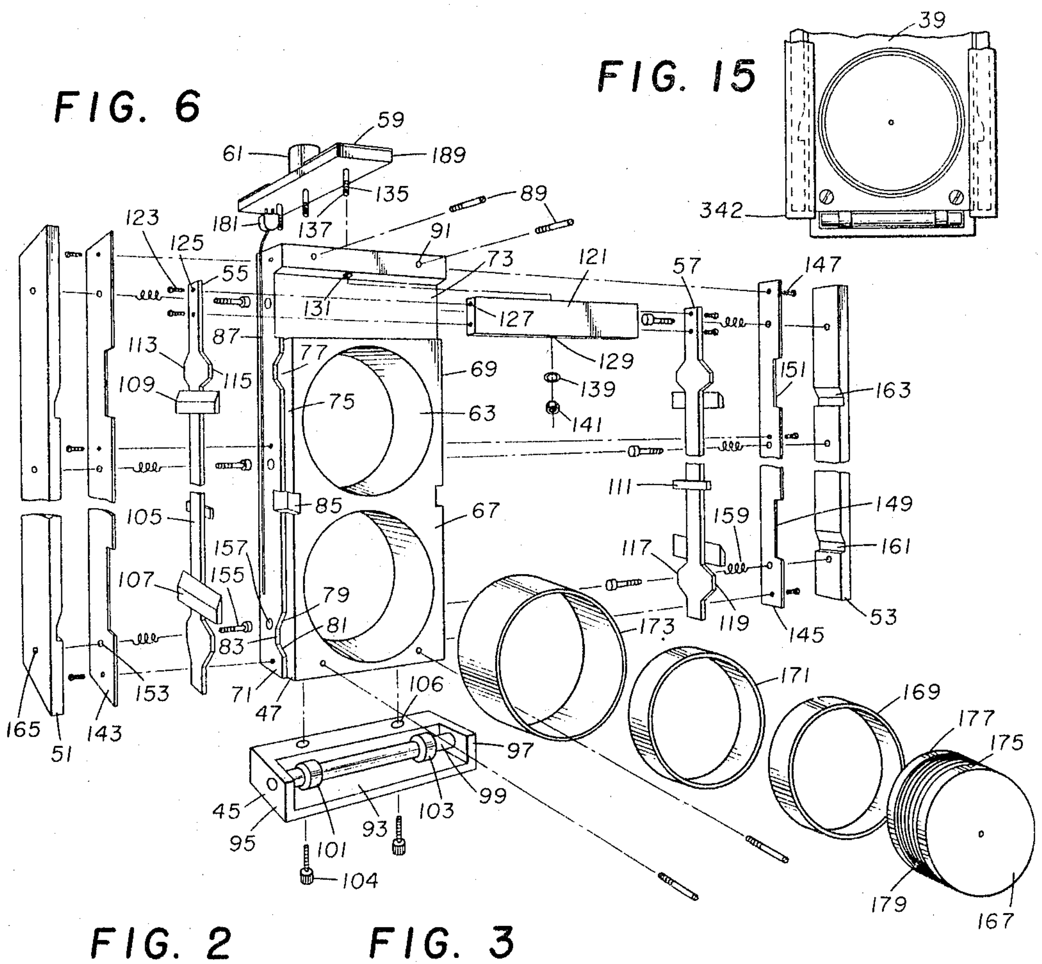
FIG. 6 is a schematic exploded view of the fixed portion of the magnetic unit holder of FIG. 2, showing the principal elements thereof, some elements being omitted for clarification purposes.
FIG. 15 is a schematic elevational view of the lower portion of the magnetic unit holder of FIG. 2, but with an encapsulating boot around the side members thereof.

The magnet housing portion comprises a rectangular slab of a suitable non-magnetizable material, such as aluminum, in which there are a plurality of uniformly spaced apart circular apertures 63 centered on the longitudinal axis of the housing portion 47. The housing portion 47 has a generally planar outer surface 65 (see FIG. 2) and an inner surface 67 (see FIG. 6) which is generally parallel to the outer surface 65, and right and left side parallel surfaces 69, 71 respectively. In the inner surface 67, there is a rectangular shaped groove 73 (see FIG. 6) which is located near the top edge of the housing portion 47 and which has a depth that is about one-third the thickness of the housing portion 47. Both the left and right side faces 69, 71, respectively (as shown in FIG. 6), have a lineal groove 75 which is adjacent the edge formed with the inner surface 67. The groove 75 extends from the lower edge of the groove 73 downward to the bottom of the housing portion 47 and is generally parallel to the longitudinal inner edge of the housing portion. A pair of notches 77 in the left and right side faces 69, 71 respectively, are each formed by upwardly and downwardly sloping planes 79, 81 respectively, which merge with a vertical plane 83 that is disposed generally parallel to the plane of the inner surface 67. The notches 77 are located a convenient distance apart and serve a purpose to be explained hereinafter. Between the notches 77, in each side face, there is a rectangular notch 85 which is formed in the linear groove 75 for a purpose that will be explained later. In the left side only there is another lineal groove 87 which extends from a location approximately opposite the central axis of the lowermost aperture 63 upward to the top edge of the housing unit 47; the axis of the lineal groove 87 being generally parallel to the longitudinal axis of the magnet housing portion 47.

While a portion of the foregoing has described the fixed magnet housing portion 47, it should be understood that the movable magnet housing 43 is constructed in a similar manner, but to opposite hand, except that there is no lineal groove 87 in the side of the movable magnet housing portion. In the upper and lower regions of the inner surface 67 of the fixed magnet housing portion 47 there are dowel pins 89 which are threaded into holes 91 in the housing portion 47, and which project therefrom. The movable magnet housing 43 has holes in corresponding locations into which the dowel pins 89 fit, so that the movable magnet housing 43 may move laterally (as seen in FIG. 4) relative to the fixed magnet housing 41.

The magnet housing base portion 45 (see FIG. 6), includes a rectangular block of non-magnetic metal, such as aluminum, in which there is a notch 93. The length of the base portion 45 is susbtantially the same as the width of the magnet housing 41, while the width of the base portion is substantially equal to the overall width of the magnetic unit holder in the retracted position, as may be seen in FIG. 3. The width of the notch 93 is substantially equal to the width of the movable magnet housing 43. In the end walls 95, 97 of the notched base portion 45 there is a suitably journaled shaft 99 on which there are fixed two rollers 101, 103. The shaft 99 and rollers 101, 103 are of such size that the plane of the top surface of the base portion 45 is substantially tangent to the rollers 101, 103. The purpose of the shaft and rollers will be described later herein. The base portion 45 is fixed to the bottom of the fixed magnet housing 41 by means of bolts 104 which extend through holes 106 in the base portion 45 and engage threaded holes in the bottom of the fixed magnet housing. The bottom surface of the movable magnet housing, when it is guided laterally by the dowel pins 89, engages and moves on the rollers 101, 103 in response to the action of both the actuating rods 55, 57 and the electromagnet units 49, as will be more fully described hereinafter.

Each of the side panel actuating rods 55, 57 includes an elongate main member 105 to which there is secured two transversely arranged wedge plates 107, 109 and a transversely arranged actuating-rod stop-bar 111. The elongate main member 105 has, on its longitudinal sides near the upper and lower ends, opposite pairs of cams 113, 115 and 117, 119, respectively. These cams mate with respective notches 77 in the sides of the fixed and movable magnet housing when in the retracted position; the elongate main member 105 fitting also in the matching linear grooves 75 in the sides of the fixed and movable housings. The rectangular stop-bar 111 is disposed in the matching rectangular notches 85 in the fixed and movable housings. The upper end of each of the elongate main members 105 is fastened to the respective left and right ends of an elongate side panel and housing actuating rod yoke bar 121 which is disposed to move upward and downward in the matching rectangular grooves 73 in the fixed and movable housings. The actuating rods 55, 57 are secured to the ends of the yoke bar 121 by a plurality of bolts 123 passing through holes 125 in the ends of the rods 55, 57 and threadedly engaging mating threaded holes 127 in the yoke bar 121. It should be noticed that, in the retracted position (as shown in FIG. 3), the upwardly and downwardly sloping surfaces of the upper and lower cams 113, 115 engage the respective matching upwardly and downwardly sloping planar surfaces 79, 81 of the notches 77. In the mid-length region of the yoke bar 121, there is a vertical hole 129 which is aligned with a vertical hole 131 in the upper portion only of the fixed housing 41. The hole 131 receives the lower end of a piston rod 135 which extends from the side panels and housing actuating cylinder and piston assembly 61. The piston rod 135 extends through the holes 131 and 129 and is threaded at its lower end, as at 137, to receive a suitable lock washer 139 and a nut 141. When tightened, the nut holds the yoke bar 121 in an adjustable position on the piston rod 135 so that, when the rod 135 moves, the yoke bar 121 and the actuating rods 55, 57 move responsively.

The transversely disposed wedge plates 107, 109 are fixed by welding, or in any other suitable manner, to the main member about where shown in FIG. 6. The edge plates 107, 109 are so arranged that the knife-like edges thereof are substantially perpendicular to the longitudinal axis of the main member 105. The knife edge portion of the upper wedge plate 107 is located adjacent the bottom of the upper cams 113, 115 and the lower or square cut edge of the wedge plate 109 is located adjacent the top of the lower cams 117, 119, as seen in FIG. 6. The length of the wedge plates 107, 109 is slightly less, preferably, than the width of the magnetic core 35 in its retracted position, as shown in FIG. 3.

Thin flat plates 143, 145, which extend from the bottom of the magnet housing portion 47 to the top thereof, are each secured to the left and right sides respectively of the magnet housing portion 47 by screws 147, or in any other suitable manner. The plates 143, 145 cover about one-half of the actuating rod main member 105 and the upper and lower cams 113, 115 respectively; the actuating rod 105 being disposed in the lineal groove 75 and the upper and lower cams 113, 115 being disposed in the notches 77 with the planes of the cams engaging the planes 79, 81 and 83 of the notches 77. The inner vertical longitudinal edge of each plate 143, 145 has two spaced apart notches 149, 151 in which the respective wedge plates 107, 109 move up and down. It will be noted that the left side thin flat plate 143 also covers the lineal groove 87. In each thin flat plate 143, 145 there are a plurality of holes 153 through each of which projects the shank of a bolt 155; the head of such bolt being contained within a hole 157 in the magnet housing portion 45. A compression type of spring 159 surrounds the shank of each bolt 155 and bears at one end against the bolt head, and at the other end against the flat plate 143, 145. The free end portion of the bolt shank is threaded and in the end of the shank there is a slot adaptable to receive the blade of a screw driver or other suitable blade.

The left and right side panel members 51, 53, respectively, are flat plates which are made, preferably, of non-magnetic material, such as aluminum, brass, or the like. In each side panel member 51, 53 there are two spaced apart parallel transverse grooves 161, 163 which are shaped to receive the respective wedge plates 107, 109. Also, each side panel member has a plurality of threaded holes 165 corresponding in number, size and location to the number, size and location of the bolts 155. In fact, the shank of each bolt 155 is threaded into a threaded hole 165 in the side panel members 51, 53, and, in this manner, the side panels 51, 53 are secured to both the fixed and movable magnet housings 41, 43, respectively.

In each of the circular openings 63 in both the fixed and movable magnet housings 41, 43 there is an electromagnet unit 49 which comprises: a magnet spool 167; a first and a second cylindrical ring 169, 171, respectively; and a third cylindrical ring 173. The magnet spool 167 is similar to a conventional type of spool which has a pair of spaced parallel circular plates 175, 177 connected by a cylindrical hub (not shown) centrally located with respect to each plate 175, 177. On the magnetic spool is wound a continuous length of wire 179 to form a coil, as in the usual manner. The ends of the wire on each magnet spool 167 are connected to a common bus which is imbedded in the lineal groove 87 and which is connected to a conventional type of electrical plug 181 at the upper end. The first and second cylindrical rings 169, 171 are each made of a non-magnetizable material, such as brass, aluminum or the like, and each neatly fits around one of the circular plates 175, 177; the width of each cylindrical ring 169, 171 being substantially one-half the width of the magnet spool 167. The outer diameters of the first and second cylindrical rings are substantially equal to each other and to the inner diameter of the third cylindrical ring 173. The outer diameter of the third cylindrical ring 173 is substantially the same as the diameter of the aperture 63, and the width of the ring 173 is substantially equal to the combined width of the rings 169, 171 as well as the thickness of the housing portion 47. And so, when the electromagnet unit 49 is assembled, the magnet spool 167 is surrounded by both of the cylindrical rings 167, 171 and is maintained there within in any suitable manner, as by a press fit, set screws or the like. The third cylindrical ring 173 surrounds the other two rings and it is placed within the aperture 63 and maintained therein in any suitable manner. Likewise, the spool and two rings 169, 171 are maintained within the third ring 173 in the same suitable manner. When the electromagnet unit 49 is installed in the magnet housing portion 47, the outer surfaces of the plates 175, 177 are flush with the inner and outer surfaces respectively of the housing portion 47, as shown in FIGS. 2 and 3.

Adjacent the top of both the fixed and movable housings 41, 43, respectively, there is a pair of spaced parallel, left and right guide blocks 183, 185, respectively, which may be fixed and secured to the outer surface of the housing units in any suitable manner. The guide blocks 183, 185 are each located an equal distance from a threaded hole (not shown) which is located on the longitudinal centerline of the housing.

As mentioned previously, the magnetic core control apparatus 46 (see FIG. 3) includes a pair of shelf angle actuating cylinder and piston assemblies 59, and a side panels and housing actuating cylinder and piston assembly 61. The shelf angle cylinder and piston assemblies 59 and the side panel and housing cylinder and piston assembly 61 are each secured to, and incorporated with, a base plate 189 which is fixed to the top of the fixed magnet housing 41. The base plate 189 projects generally perpendicularly outward from both of the magnet housing units 41, 43. The side panel rods and housing actuating cylinder and piston assembly 61 is located near the central longitudinal point of the base plate 189 with each shelf angle actuating cylinder and piston assembly 59 located substantially an equal distance on either side thereof. Each cylinder is provided with fluid inlet passages (not shown) to each of which a fluid conduit may be connected in the usual manner. Each cylinder and piston assembly has two inlet passages, communicating with the cylinder space above and below the piston therein, so that each piston is double acting.

In a preferred embodiment of the magnetic unit holder, the control apparatus is operated pneumatically. However, it is recognized that the control apparatus may be operated either electrically, hydraulically, or in any other suitable manner. As mentioned previously, the piston rod 135, projecting downwardly from the side panels and housing actuating cylinder and piston assembly 61, is adjustably connected to the side panel and housing actuating rod yoke bar 121. In like manner, each of the shelf angle actuating cylinder and piston assemblies 59 has a piston rod 193 extending downwardly from the base plate 189. The lower end of each rod 193 is also threaded for a purpose to be explained presently. The lower end of each of the piston rods 193 fits loosely in a slot 195 in a tab 197 which is fixedly secured to and projects outwardly from a shelf angle 199. The shelf angle 199 has an upstanding leg 201, to which the tab 197 is fixed, and an outwardly projecting horizontal leg 203 in the central region of which there is an elongate slot 205 for a purpose to be explained hereinafter. There is another slot 207, in the upstanding leg 201, which is in the general plane of the slot 205, and which is for the purpose of providing adjustability of the shelf angle 199 with respect to the magnetic unit holder 39. The shelf angle 199 is located between and is restrained laterally by the guide blocks 183, 185 so that it may move only upward and downward. The shelf angle is fixed in a selected position by means of a bolt 209, with a washer 211, which is threaded into the hole in the housing unit. A nut 213 and a lock nut 215 (see FIG. 9) are threaded onto the end of each piston rod 193 and engages the top and bottom surfaces respectively of the tab 197 to fix and secure the shelf angle 199 in a vertical position, with respect to the magnetic unit holder pneumatic control apparatus 46. The nut 213 and lock nut 215 provide an easy and simple means to adjust and fix the position of the shelf angle 199 for a purpose that will be revealed hereinafter.

The magnetic unit holder 39 may be of any convenient size. In a typical embodiment the width (with the side panel members 51, 53 retracted) is about eight inches, and the thickness (with the movable magnet housing portion 43 retracted) is about three inches. The height of the magnetic unit holder 39 may, also, be any convenient dimension. It is preferred, however, that each magnetic unit holder, of a plurality thereof, be tall enough so that sections of a wall or walls type of masonry, at least eight feet high, may be erected and completed without moving and relocating the magnetic unit holders 39 in that section. It has been found convenient to arrange the apertures 63 on six inch centers, and to make the magnet spools 167 about five inches in diameter.

II.—*Unit of masonry-magnetic type*

Figure 10:
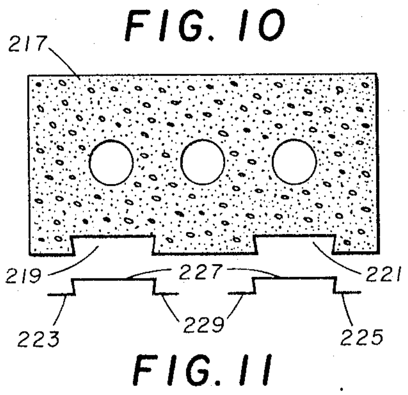
FIG. 10 is a schematic plan view of one form of a typical unit of a masonry.
Figure 11:
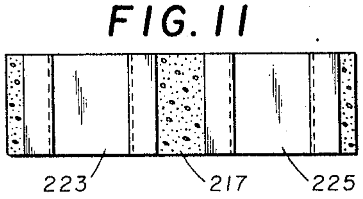
FIG. 11 is a schematic rear side elevational view of the typical unit of masonry of FIG. 10.

One typical unit of masonry 217 which is suitable for use with the magnetic unit holder 35 is illustrated in FIGS. 10 and 11. The unit 217 comprises a brick of conventional shape and size, but which has a pair of parallel spaced apart dovetails or mortise-like grooves 219, 221 in one of its long vertical surfaces. The mortise-like grooves 219, 221 are spaced, center to center, approximately one-half the length of the unit 217 and approximately equally each side of the center line of the unit. A pair of metal clips 223, 225, which are made of a magnetizable material, are each provided with a tenon-like protruding portion 227 that fits one of the mortise-like grooves 219, 221 and with flat portions 229 that extend on each side of the tenon-like protruding portion 227. The tenon-like protruding portion 227 is so made that, when it is pressed into a mating mortise-like groove 219, 221, it will become firmly and frictionally lodged therein. Each metal clip 223, 225 is inserted into a mating mortise-like groove 219, 221 so that the distance from the plane of the front face of each unit, which is the face opposite the grooves, to the plane of the rear faces of the metal clips 223, 225 in each unit, is substantially constant for all units of masonry of this type.

Figure 12:
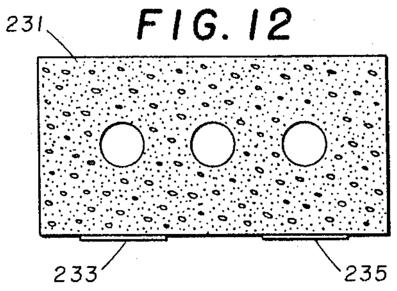
FIG. 12 is a schematic plan view of another form of a typical unit of a masonry.
Figure 13:
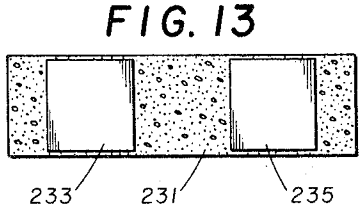
FIG. 13 is a schematic rear side elevational view of the typical unit of FIG. 12.

Another typical unit of masonry 231, which is suitable for use with the magnetic unit holder 35, is delineated in FIGS. 12 and 13. This unit 231 has the size and shape of a conventional brick. A pair of magnetizable plates 233, 235 are adhesively secured to the back vertical surface of each unit, as shown in FIGS. 12 and 13; the plates being spaced apart in the same relation as the clips 223, 225 mentioned previously. While the magnetizable plates 233, 235 are preferably secured to the unit 231 by a suitable adhesive substance, it should be recognized that the plates 233, 235 may be secured to the unit in any other suitable manner.

Figure 23:
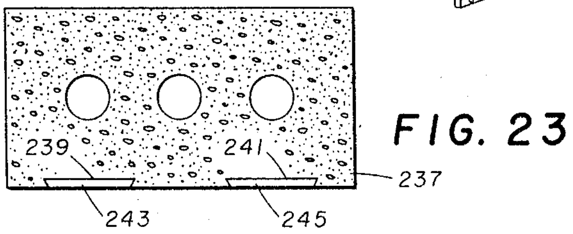
FIG. 23 is a schematic plan view of another form of a typical unit of masonry.
Figure 24:
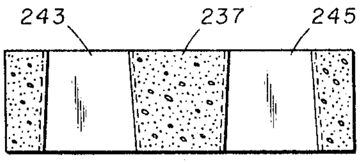
FIG. 24 is a schematic rear elevational view of the typical unit of masonry of FIG. 23.

Yet another typical unit of masonry 237 is delineated in FIGS. 23 and 24. This unit 237, also, has the size and shape of a conventional brick, but there are a pair of tapered mortise grooves 239, 241 in the back vertical surface as shown in FIGS. 23 and 24. The mortise grooves are tapered from the bottom surface of the unit toward the top surface and are spaced apart, center to center approximately one-half the length of the unit and approximately equally each side of the center line of the unit 237. A pair of magnetizable metal plates 243, 245, each of which has tapered longitudinal edges, are inserted in the respective tapered mortise grooves 239, 241. The metal plates 243, 245 may, if desired, be cemented in the grooves 239, 241 so as to maintain the plates in position.

It should be understood that masonry units utilizable with apparatus and methods in accordance with the principles of my invention may take any desired suitable shape or form, not restricted to those specifically herein disclosed.

III.—*Unit spacer or grid*

In FIG. 1 there is shown, among other things, one form of unit spacer or grid 247. The unit spacer or grid 247 comprises a plurality of spaced apart parallel horizontal plates 249 and a plurality of spaced apart parallel vertical plates 251 which are disposed between and fixed to the horizontal plates 249. The horizontal plates 249 are approximately four unit lengths long and they are spaced apart vertically substantially the width of a unit of masonry. The thickness of each horizontal and vertical plate 249, 251 is made about one-fourth inch or slightly less than the width of a common joint of mortar or other cementatory bonding substance. It will be observed, by referring to FIG. 1, that the number of spaced parallel vertical plates 251, which are located between the lowermost horizontal plate 249 and the one next above it, is three. Thus, there are four equal sized unit spaces between the lowermost plate 249 and the one next above it, and in each of the four unit spaces there may be placed one full unit of masonry. It will be noticed, by referring again to FIG. 1, there are four spaced apart vertical plates 251 between the second and third horizontal plates 249 (counting upward from the lowermost or first horizontal plate) and that these are so arranged that there are three full sized unit spaces located between two half-unit spaces. It will be noticed, then, that the unit spaces in a first group of alternate horizontal rows are vertically aligned, and that the unit spaces in a second group of alternate horizontal rows are also vertically aligned. But, the unit spaces in the second group are displaced one-half unit length from the unit spaces in the first group. The unit spacer or grid 247 may, of course, be made of any suitable non-magnetizable material; a suitable typical material being aluminum. Moreover, in some applications the number of full-length unit spaces in the lowermost row may be more or less than four, and if preferred, the lowermost or bottom row, and the alternate rows thereabove, may have a plurality of full-length unit spaces disposed between two half-length spaces.

The unit spacer or grid 247 may be of any convenient size. In a typical embodiment the width (as mentioned previously) is about equal to four unit lengths including the width of the cementatory bonding joints between the units. The height, however, is equal to the distance from the shelf angle 199 to the bottom of the magnetic unit holder 39, which in a typical embodiment is about eight feet. It should be understood, however, that the height and width may be varied to suit conditions in some applications.

IV.—*Joint form board-magnetic type*

Figure 9:
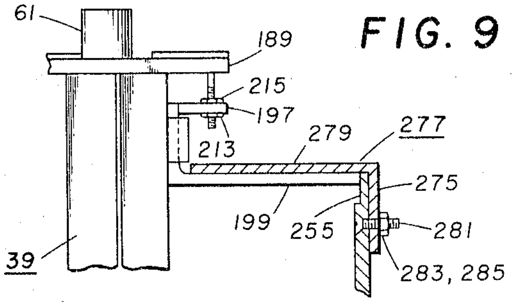
FIG. 9 is a schematic side view of a portion of a magnetic unit holder showing the shelf angle in relation thereto and in relation to the joint form board.
Figures 7, 8:
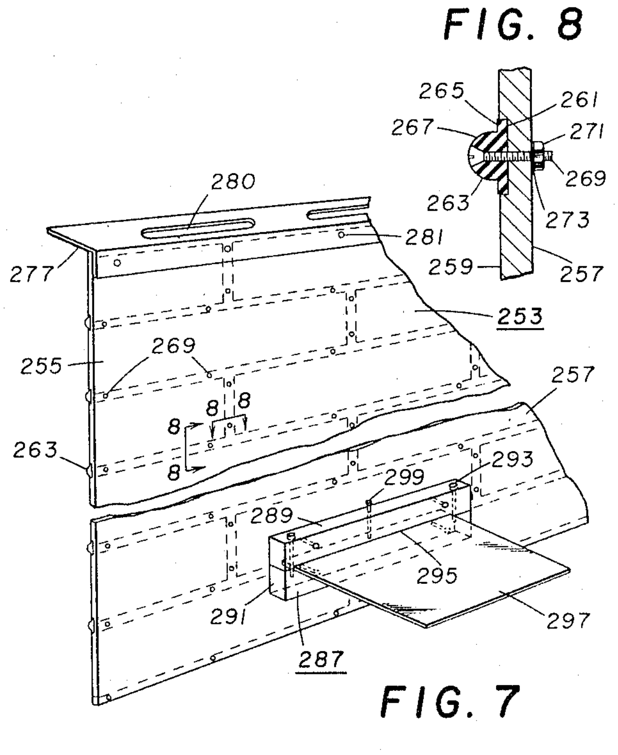
FIG. 7 is a schematic perspective view of a fragment of a joint form board.
FIG. 8 is a sectional view taken along line 8—8 of FIG. 7.

In FIG. 7 there is shown a fragment of one type of joint form board 253, which may also be observed in an operative position in FIGS. 1 and 9. The joint form board comprises a non-magnetizable plate 255, one surface 257 (the outer surface, see FIG. 8) of which is smooth and flat and the outer surface 259 (the inner surface) is scored with a plurality of horizontal and vertical grooves 261. The grooves 261 are arranged in the same manner as the horizontal and vertical plates 249, 251, respectively, which in reality are arranged in the same usual manner as the cementatory joints between the several units of a masonry. In each groove 261, there is a resilient joint form 263 which is made up of a flat rectangular portion 265 and a half-round portion 267. The joint form 263 is secured to the inner surface 259 of the plate 255 by a plurality of spaced apart screw bolts 269, nuts 271 and washers 273, as seen in FIG. 8. Of course, other suitable fastener devices may be employed if preferred. While a particular joint form 263 has been shown and described, it will be understood that joint forms having sundry other shapes may be used. For example, the half-round portion 267 may be replaced with either a triangular shaped portion, a rectangular portion, a semi-elliptical portion, or any other preferred shape. Each of these shaped portions would, of course, be integrally formed with a rectangular portion similar to or like the rectangular portion 265. The top edge portion of the plate 255 (see FIG. 9) overlies and is secured to the inner surface of the vertical leg 275 of a joint form board angle 277. The other leg 279, which is horizontal, extends at right angles in the direction of the joint forms 263, as shown in FIG. 7. In the horizontal leg 279 there are a plurality of spaced apart elongated apertures 280 which are for a purpose to be explained hereinafter. Moreover, the joint form board angle 277 is secured to the plate 255 by means of a plurality of spaced apart countersunk screw bolts 281, nuts 283 and washers 285, as may be seen in FIG. 9. The angle 277 may also be made of any suitable non-magnetizable material; a suitable typical material being aluminum.

On the outer surface 257 of the plate 255, there are located and secured thereto three rectangular shaped holding plate housings 287 which are made up of an upper housing portion 289 and a lower housing portion 291. The upper and lower housing portions 289, 291 are secured together and to the joint form board plate 255 by a plurality of suitable fastener devices 293, such as the countersunk machine screws which are shown in FIG. 7. In the common mating surface of the upper and lower housing portions 289, 291, there is a rectangular groove 295. A rectangular shaped joint form board holding plate 297 is disposed in such groove 295 and it is free to be reciprocated therein. Moreover, the holding plate 297 also freely passes through a rectangular slot (not shown) in the joint form board plate 255; such slot being located in one of the horizontal grooves 261 of the joint form plate 255. In way of the slot in the plate 253, the joint form 261, of course, is omitted. There is, in the upper housing portion 289, a threaded vertical set screw 299 which may be caused to engage the upper surface of the holding plate 297 and maintain the holding plate in a fixed selected position. The three holding plate housings 287 are arranged on the outer surface of the joint form board plate 255, as shown in FIG. 1, in the form of an isosceles triangle; that is, two housing units 287 are located in spaced apart horizontal arrangement near the bottom of the plate 255 while the third housing unit 287 is located near the top of the plate 255. In some applications, it may be preferable to use more than the three holding plate housings. The holding plate 297 is made of a suitable magnetizable material, but the housing portions 289, 291 and fastener devices 293, 299 are made of a suitable non-magnetizable material; such a material being aluminum.

The horizontal length of the joint form board 253 is substantially equal to the horizontal length of the unit spacer or grid 247, and the vertical height of the joint form board 253 is, also, substantially equal to the vertical height of the unit spacer or grid 247.

V.—*Base plate*

Figure 14:
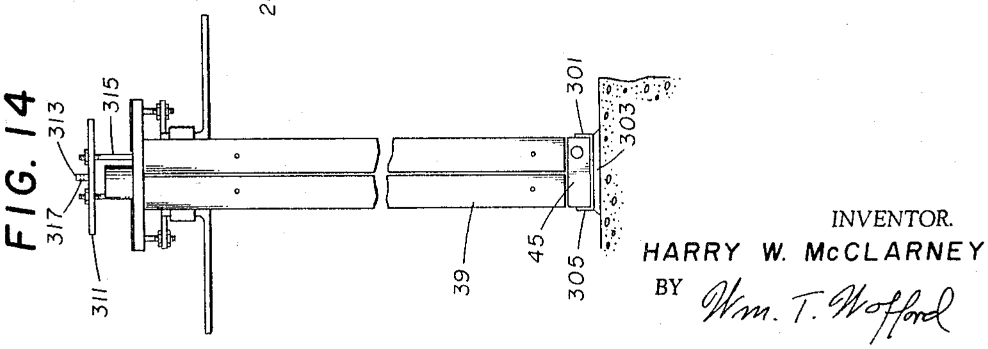
FIG. 14 is a schematic side view of a magnetic unit holder in position, but not expanded.

In FIGS. 1 and 14 there is illustrated one form of a base plate 301, which is a channel member having the usual web portion 303 and spaced parallel flanges 305. It will be observed by referring to FIGS. 14, et. seq., that the distance between the inside faces of the flanges 305 is substantially equal to the width of the magnet housing base portion 45. The width of the flanges 305 (or height thereof, as shown in FIGS. 14, et. seq.) is just less than the thickness or depth of the housing base portion 45. The length of the base plate 301, for reasons to be explained presently, may be any convenient and purposeful dimension. In some applications, it may be preferable to provide a series of holes (not shown) in the web portion 303, for a purpose to be explained hereinafter.

VI.—*Magnetic unit holder; mode of operation*

To understand the mode of operation of the magnetic unit holder 39, reference may be made initially to FIG. 1. It will be convenient to describe firstly the mode of operation of the magnetic type of unit holder 39 in connection with the construction of a double wall masonry 37. Although, it is recognized that the magnetic unit holder may be used to construct other types of masonries.

It may be assumed that a suitable foundation, or footing, or sill, designated generally hereinafter as the foundation 307, is available. It is generally recognized that the top surface of such a foundation 307 is not level, nor is it smooth enough for use with the apparatus of the present invention. Therefore, as a preliminary step, it is desirable to lay a bed joint of cementatory bonding substance 309, such as mortar or cement, on the top surface of the foundation. The base plate 301 may then be laid on the bed joint, leveled and aligned, by any appropriate apparatus, before the bed joint substance sets and hardens. One of the purposes of the holes in the web 303 of the base plate is to admit some of the bonding substance through them so as to improve the fixation of the base plate. Now, then after the base plate 301 has been set and established, the magnetic unit holders 39 may be erected; it being preferable to erect them as a group of four, as shown in FIG. 1. However, it is to be understood that more or less than four magnetic unit holders may be erected simultaneously, and if preferred, each magnetic unit holder may be handled individually.

It will be appreciated, also, that any suitable apparatus may be used to handle a single unit holder or a plurality of magnetic unit holders. One such apparatus is indicated in FIG. 1 and it comprises: a lifting plate 311; a back bar 313; and a plurality of threaded stud bolts 315. The lifting plate 311 is long enough to conveniently cover the top of four, or the particular number of magnetic unit holders being handled. The back bar 313, which is fixed to the lifting plate 311, extends from one end of the lifting plate to the other end and is located, preferably, on the longitudinal center line of the lifting plate 311. Near each end of the back bar 313, it is convenient to provide a hold 317 which should be large enough to receive auxiliary lifting equipment, such as the hook and sling type of apparatus 319 shown in FIG. 1. In the lifting plate 311 there are a plurality of pairs of elongate holes, transversely disposed on opposite sides of the back bar 313 and in each hole there is one of the stud bolts 315 (see FIG. 14). Each bolt of a pair is conveniently threaded into the top portion of a magnetic unit holder 39 and nuts are threaded on the upper ends of the stud bolts above the lifting plate 311. Thus, by adjusting the position of the pairs of nuts, the tops of the several magnetic unit holders may be brought to a common level.

And so, with the aid of such a lifting apparatus, a group of magnetic unit holders (for the purpose of the following description only, such a group includes four magnetic unit holders) may be lifted simultaneously and so placed that the magnet housing base portion 45 of each magnetic unit holder 39 fits snugly between the upstanding flanges 305 of the base plate 301, as may be noticed by referring to FIG. 14 Now, since the base plate 301 has been previously aligned, leveled and established the group of magnetic unit holders will also be aligned and each will stand substantially plumb. Auxiliary means to hold the units in a plumb position may be provided, if desired.

Figure 20:
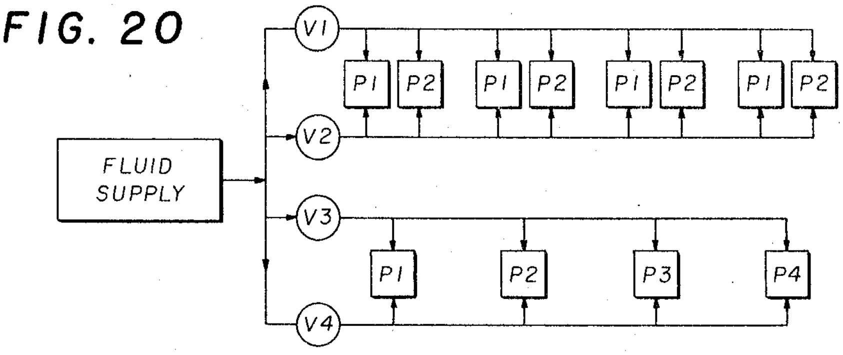
FIG. 20 is a diagrammatic arrangement of one fluid control system for a plurality of magnetic unit holders.

Thereafter, each magnetic unit holder control apparatus 46 may be conveniently connected to a common fluid source for actuating purposes in accordance with the arrangement suggested in the fluid control system diagram, FIG. 20. Likewise, the electromagnet units 49 of each magnet unit holder may be connected to a source of electric power, in accordance with arrangement suggested in the electrical control system diagrams, FIGS. 21 and 22.

After making the aforementioned fluid and electrical connections, the magnet unit holders 39 may be expanded laterally as well as transversely. That is, the left and right side panel members 51, 53 respectively, may be moved laterally, or away from both the fixed and movable housing portions 41, 43 as shown in FIG. 5 and, simultaneously, the movable magnet housing 43 may be moved transversely, or away from the fixed magnet housing, as is indicated generally in FIG. 4. These lateral and transverse movements are accomplished by actuating or opening a valve, V4 (see FIG. 20) so that fluid from the "Fluid Supply" acts on the pistons P3 and causes them to move upward. Since each piston P3 is connected, by means of its respective actuating rod yoke bar 121, to both the left side panel actuating rod 55 and the right side panel actuating rod 57, the upward movement of the piston P3 causes the actuating rods 55, 57 to move upward also. While each actuating rod 55, 57 is moving upward, the upper cams 113, 115 and lower cams 117, 119 coact with the adjacent upwardly sloping planes 79 in the fixed and movable magnet housings 41, 43, respectively, and the movable magnet housing 43 is caused to move transversely. Simultaneously, the wedge plates 107, 109 coact with the grooves 161, 163, respectively, and urge the side panel members 51, 53 in a lateral direction, as mentioned previously. The actuating rods 55, 57 move upwardly until their respective stop bars 111 engage the upper surface of the rectangular notches 85, or until the movable magnet housing 43 engages a plurality of adjustable stop bolts 321 which are threaded into recesses 323 in the fixed magnet housing 41 (see FIGS. 2 and 4). Each stop bolt 321 has a head portion 325 which is disposed to slide in a smooth bore 327 in the movable magnet housing. If preferred, a suitable threaded bore cap 329 may be screwed into the bore 325, as shown in FIG. 4, to seal the same.

As soon as the magnetic unit holders have been expanded, the shelf angles 199 should be raised, if they are not already raised. This is accomplished by actuating or opening the valve V2 (see FIG. 20) so that fluid from the "Fluid Supply" acts simultaneously on the pistons P1 and P2 of each magnetic unit holder control apparatus 46. The shelf angles 199 may now be adjusted to a common level, by loosening the nuts 213 and lock nuts 215 and manually moving the shelf angles 199 upward or downward, as the situation warrants, to achieve a common level. Thereafter, the nuts and lock nuts 213, 215, respectively, may be tightened again. The bolt 209, of course, should be hand tight or tight enough to provide no restraint, since the shelf angle, in operation, must freely move downward and upward. It is convenient to bring the shelf angles 199 to some predetermined common level, such as may be indicated on a mason's type of modular scale 331 attached to outer faces 65 of both the fixed and movable magnet housings 41, 43. Such a scale may be conveniently subdivided in modular units, in the same manner as the usual brick mason's rule. By means of the scale 331, the shelf angles 199 will then be set to a common level agreeable with the type and style of unit of masonry that is being laid.

Figure 16:
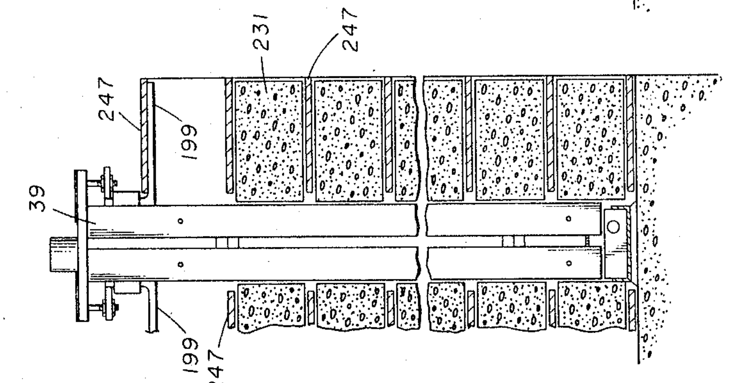
FIG. 16 is a schematic side view of an expanded magnetic unit holder with units of the masonry (shown in sectional form) held in proper alignment.

The next step in the procedure is to place the unit spacers or grids 247 in position adjacent the faces of the magnetic unit holders. In such position, the under surfaces of the topmost horizontal plates 249 rest on the upper surfaces of the self angles, and the grids 247 depend therefrom, as shown in FIG. 16. The inner edges of the vertical and horizontal plates of the grids 247 will be parallel to and spaced slightly from the vertical outer faces of the electromagnet units 49.

Figures 21, 22:
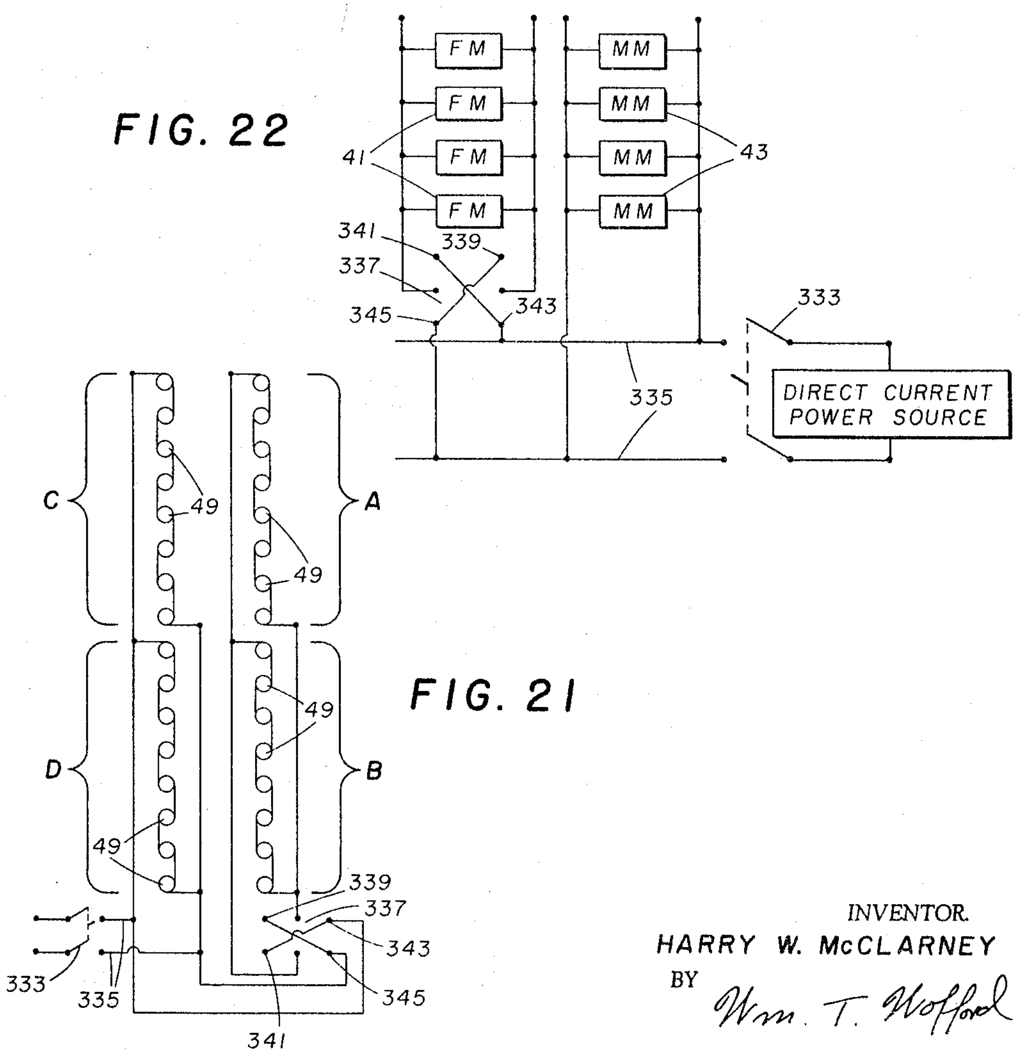
FIG. 21 is a diagrammatic arrangement of an electrical control system for a single magnetic unit holder.
FIG. 22 is a diagrammatic arrangement of an electrical control system for a plurality of magnetic unit holders.

After the unit spacers or grids 247 are set in place, a unit of masonry may be inserted into each unit space in the grid, except that no units of masonry are placed in the spaces of the top horizontal row. These unit spaces are purposely not filled. Each unit of masonry should be inserted of course, so that the metal clips 223, or plates 233, 243, (depending upon the type of unit which is used) face toward the electromagnet units 49. After all unit spaces are loaded, the electromagnet units 49, in both the fixed and the movable housings of each unit holder, may be energized by closing an electrical circuit. This may be done, as shown in FIGS. 21 and 22, by first closing a line switch 333 in a pair of bus type conductors 335, and then actuating a double-pole double-throw type of reversing switch 337, which is connected across the bus type conductors 335. When the actuator of the double-pole double-throw reversing switch 337 connects the terminals 339, 341 with the bus 335, the electromagnet units 49 in group A and group B, which are located in the fixed magnet housing 41, have the same polarity as the electro-magnet units 49 in group C and group D, which are located in the movable magnet housing 43. In this situation, then, the magnetizable metal plates of each unit of masonry are attracted toward one or more electromagnet units 49, and the magnets of the fixed and movable housings tend to repel each other. FIG. 16 represents a typical side elevational view of a magnetic unit holder 39 which has been expanded and which is supporting a unit loaded grid 247; the metal plates of the units being contiguous with the energized magnet faces. The strength of each electromagnet unit 49 is sufficient to support, in cantilever fashion, one or more units of masonry without the support provided by the unit spacer or grid 247. And so, the unit spacers or grids 247 may now be removed. It is, however, necessary to first lower the shelf angles. To accomplish this, the valve V2, shown in the fluid diagram, FIG. 20, is closed and the valve V1 is opened; whereupon, the pistons P1 and P2 of each magnetic unit holder control apparatus 46 moves downward. The stroke of each piston P1 and P2, in a typical embodiment, is about one-sixteenth of an inch; this being a sufficient distance to free the grid from the units. When the unit spacers or grids 247 are in their lowered position, they no longer contact the units, and the grids may be readily withdrawn from between the several units, as may be seen by referring to FIG. 1. As soon as the grids have been withdrawn and removed, the valve V1 is closed and the valve V2 is opened; the shelf angles then move upward again to the raised position.

Figures 17, 18:
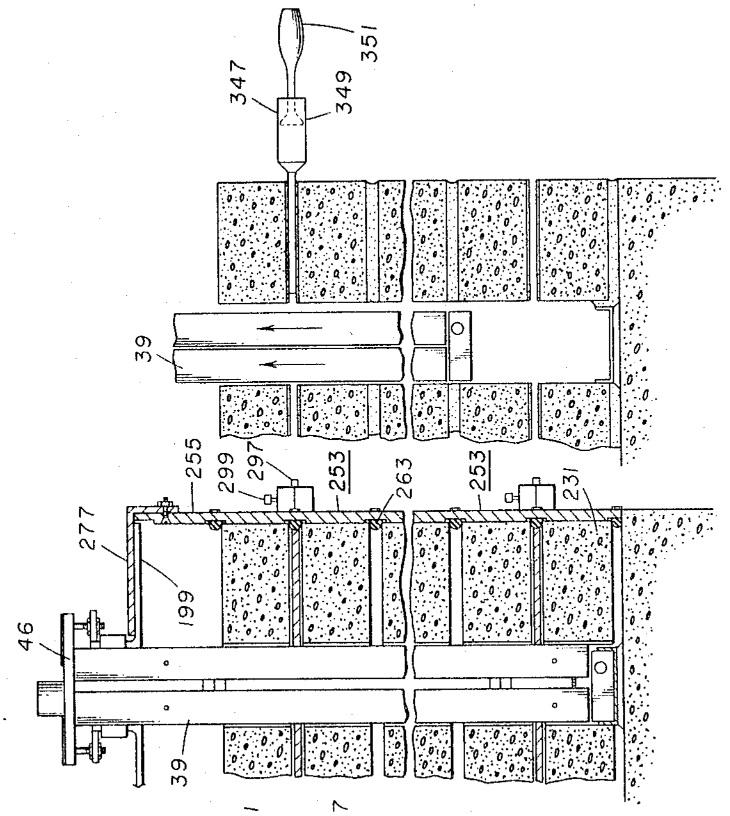
FIG. 17 is a schematic side view of an expanded magnetic unit holder with units locked in place preparatory to pouring the cementary joint substance.
FIG. 18 is a schematic side view of a contracted magnetic unit holder being removed from a double-wall type of masonry.

The next step in the procedure is the placing of the joint form board 253 in its position. This is done in the following manner: The joint form board 247 is placed adjacent the front face of the units so that the joint form board angle 277 rests on the top surface of the shelf angle 199, as may be seen by referring to FIG. 17. The half-round portion 267 of the joint forms 263 (or other suitable shaped portion) fits neatly in the spaces between adjacent units. After releasing the holding plate set screws 299, the joint form board holding plates 297 may be inserted between their respective immediately adjacent upper and lower units until the inner edge portions of the holding plates contact the electromagnet units 49. Since the joint form board holding plates 297 are made of magnetizable material, they will, of course, be attracted to and held by the already energized electromagnet units 49. After the holding plates 297 are seized by the electromagnets, the holding plate set screws 299 may be screwed into the upper housing portion 289 until the set screws contact and engage the holding plates 297. The joint form board 253 is now in useable position. FIG. 17 represents a typical side elevational view of a magnetic unit holder 39 which supports a plurality of units of masonry 231 and which supports, upon the shelf angles 199, the joint form boards 253, and it should be noted that the joint form board holding plates 297 are extended to engagement with the electromagnet units 49. In the right hand area of FIG. 1, there is delineated a joint form board 253 which has been placed in position in accordance with the steps of this procedure.

It may be mentioned that, in practice, two or more adjacent unit spacers or grids may be set up simultaneously on each side of the unit holders 39, and, that two or more adjacent joint form boards may be set up on each side of the unit holders 39.

The next step in the procedure is to bond the units of masonry together to form a common mass. Preferably, this is done by pouring a mortar type of bonding substance through the several elongate holes 280 in each joint form board angle 277. Any one of the conventional types of mortar that is satisfactory may be used; such mortar comprising generally a plastic mixture of cementitious materials, fine aggregate and water. It is preferred that the cementatory bonding substance, or mortar, have the consistency of grout so that it may permeate the interstices between and through the units and form a more complete bond between the units. The mortar, while filling the voids between the units, will normally drive off entrapped air, if any there be, past the joint forms, and the mortar will attain adequate compaction without the necessity of vibrating. But, if preferred, the mass of mortar may be vibrated, in any appropriate manner.

It should be pointed out at this point, that the left and right side panel members 51, 53, respectively, may be encased in a suitable resilient impervious covering 342, which may be sealed along its vertical edges to the front faces of the fixed and movable housings 41, 43, as is indicated generally in FIG. 15. If desired, the magnet housing base portion 45 may also be similarly encapsulated. The encapsulation, is for the purpose of preventing mortar from incasing the movable parts of the side panels, as well as the housing base portion.

After the mortar has set sufficiently, which in a typical case may occur within about thirty minutes after pouring, the joint form board and the magnetic unit holders may be removed. To begin the removal process, the polarity of the electromagnet units 49, of each magnetic unit holder 39, is changed by reversing the double-pole double-throw switch 337. The switch actuator now connects the terminals 343 and 345 across the bus, and, this reverses the polarity of the electromagnet units in the fixed magnet housing. Accordingly, the respective electromagnets in the fixed and movable housings now tend to attract, rather than repel. Consequently, the movable magnet housing 43 is urged to move transversely, back to its initial position. Simultaneously, or nearly so, the valve V4 is closed and the valve V3 is opened, so that fluid flows in the control system and causes the pistons P3 to move the actuator rods downward. This causes the cams 113, 115 and 117, 119, as well as the wedge plates 107, 109, to return to their original location. Simultaneously, with the downward movement of the actuator rods, the movable magnet housing portion 43 is released and, under the attractive influence of the fixed housing electromagnet units, it moves toward the fixed unit and returns to its initial starting position. The magnetic unit holders are now in their retracted positions and the electric current to the electromagnet units 49 may be cut off completely, by opening the line switch 333. When the electromagnet units 49 are de-energized, the joint form board holding plates 297 are released and they may be withdrawn, after releasing the set screws 299. The joint form board 253 may now be completely removed. After the joint form boards 253 have been removed from each side of the group of magnetic unit holders, the wall surfaces may be washed down, if necessary, to remove any traces of mortar, should some appear.

It will be evident that voids occur in the mortar joints, where the holding plates were located, and so, it is necessary to point up these void places with mortar. Of course, any suitable instrument or tool may be used to accomplish this; one such instrument being shown in FIGS. 18 and 19. The instrument referred to is a mortar joint extruder 347 which includes a main body portion 349 and a plunger 351. The main body portion 349 comprises a pair of spaced parallel T-shaped plates 353, which are joined at the longitudinal side edges by plate members 355; the ends of the main body portion 349 being open. The plates 353, as shown in FIG. 18, are spaced closely together at one end, and curve upwardly and downwardly at the other end to form a head portion 355 in which the plunger 351 may reciprocate. The plunger 351 comprises a triangular shaped body portion 357 and a handle 359 fixed thereto. The body portion 357 is well suited to the head portion 355 and when it reciprocates in the body portion, as just mentioned, it produces suction and pressure alternately at the smaller open end. The use of the mortar joint extruder 347 is simple and effective. The smaller open end is inserted into a supply of grout and the plunger 351 is withdrawn causing a suction which fills the main body portion 357 with grout. Then, after inserting the smaller end into one of the voids, the body may be withdrawn at the same time the plunger is injected into the head portion; extruding the grout into the void.

While some workmen are filling the voids, in the manner just mentioned, others may be removing the group of magnetic unit holders (as indicated in FIG. 18) by means of the sling 319 and suitable auxiliary hoisting equipment. The group of magnetic unit holders which have just been removed may be washed down to remove traces of mortar, and then reset in position again. In a particular application it will be convenient to simultaneously use a plurality of groups of holders; each group being operated in the manner described heretofore.

VII.—*Vacuum-cup type unit holder*

Figure 25:
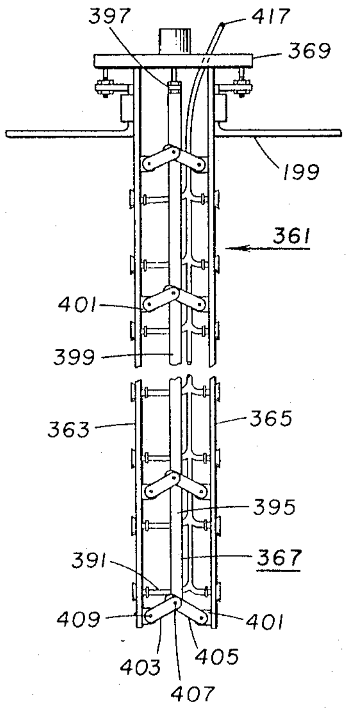
FIG. 25 is a schematic side elevational view of another form of unit holder.
Figures 19, 26, 27, 42:
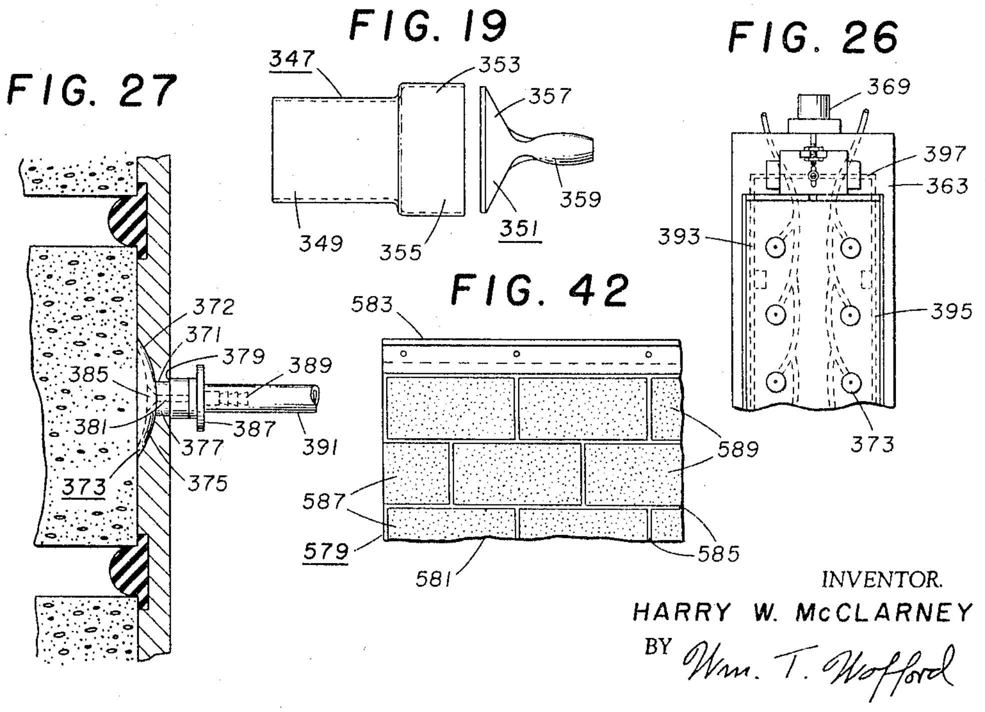
FIG. 19 is a schematic plan view of a joint extruder.
FIG. 26 is a schematic front elevational view of a fragment of the upper portion of the unit holder of FIG. 25.
FIG. 27 is a partial sectional view of one of the panel faces of the unit holder of FIG. 25 in operative form.
FIG. 42 is a schematic elevational view of a fragment of an adhesive type of joint form board unit holder.

FIGS. 25 and 26 show a side or end elevational view and a partial front elevational view respectively, of a vacuum-cup type unit holder 361 which comprises: a front plate 363, which is the left side plate as viewed in FIG. 25; a back plate 365, which is the right side plate as viewed in FIG. 25; a plate actuating linkage system 367; and a vacuum-cup type unit holder control mechanism 369.

The front and back plates 363, 365, respectively, are substantially alike, and therefore a detailed description of both plates will not be necessary; it suffices to describe the front plate 363. This plate is a rectangular flat planar member which, in width, is approximately equal to the length of a unit of masonry. The length of the plate 363 is somewhat longer than the height of a common type of masonry, which is typically about eight feet. The plate member 363, moreover, is pierced by a plurality of holes 371 (see FIG. 27) which are arranged in spaced parallel vertical or longitudinal rows. The holes 371 in each row are uniformly spaced apart, and the corresponding holes 371 in the vertical rows are disposed at substantially the same horizontal level, as shown in FIG. 26. In the outer surface of each plate member 363 there are a plurality of dish or bowl-shaped depressions 372 each of which is concentric and communicates with one of the holes 371. In FIG. 27 there is shown a detail of a typical vacuum type cup 373 in one operative position. The vacuum cup 373 comprises a dish or bowl-shaped portion 375 and a stem 377 which is integrally formed with the bowl-shaped portion 375, and which extends axially therefrom and through the hole 371. The stem 377 has a slight shoulder 379 on its outer surface which engages the inner corner of the hole 371, as seen in FIG. 27. Both the stem 377 and the dish or bowl-shaped portion 375 are provided with an axial passage 381 extending therethrough. The end of the passage 381, which is within the dish or bowl-shaped portion 375 is flared to form a generally frusto conical cavity 383. A vacuum cup holding pin 385 (or other suitable holding device) is disposed in the passage 381 and one end portion of the holding pin 385 is threaded and extends slightly beyond the end of the stem 377. A suitable threaded hose fitting 387 is screwed onto the threaded end portion and is provided with an adapter 389 of conventional shape to receive and retain the end portion of a flexible hose or tube 391. An axial passage is provided in the holding pin 385, and at the end of the passage, adjacent the head portion of the pin, there is a cross passage providing communication between the frusto conical cavity region 383 and the axial passage. The axial passage, of course, communicates with the hose 391 for a purpose to be described presently.

It will be observed, by referring to FIG. 25, that the structure of the vacuum-cup type of unit holder control mechanism 369 is substantially the same as the structure of the magnetic unit holder control mechanism 46, which has been previously described. And so, a detailed description of the control mechanism 369 will not be necessary. The plate actuating linkage system 367, which is shown in the retracted position, comprises both left and right plate actuator mechanisms 393, 395, respectively, as may be seen in FIG. 26. Each such mechanism is connected at its upper end to the end of a yoke bar 397 which functions similarly to the actuating rod yoke bar 137 described previously. And so, since the structures of the left and right actuating mechanisms 393, 395, respectively, are substantially the same, it will not be necessary to describe both of them. Therefore, a description of only the right actuating mechanism 395 (as viewed in FIG. 25) will suffice. The right actuating mechanism 395 comprises a main elongate bar 399 which is suitably fixed, at its upper end, to one end of the yoke bar 397, and which depends from the yoke bar between the front and back plates 363, 365, respectively. A plurality of lugs 401 are fixed to the inner surfaces of the back and front plates 363, 365, and arranged in pairs, as shown in FIG. 25, at substantially the same horizontal level. A pair of elongate stiff link members 403, 405 are pivotally connected together near one end and to the main elongate bar 399 by means of a pivot pin 407. The pin 407 is disposed at a level slightly above the level of the lugs 401, when the unit holder 361 is retracted, as shown in FIG. 25. The free end of each link member 403, 405 is pivotally connected to the lugs 401 also by a pivot pin 409. The distances from the pivot pin 407 in the main elongate bar 399 to the pivot pins 409 in each of the associated lugs 401 are substantially equal. Thus, when the main elongate bar 399 is moved upward and downward responsively to the movement of the control mechanism 369, the several pairs of stiff elongate link members 403, 405 pivot about the pins 407 to such a position that the pins 407, 409 lie in a substantially straight, horizontal line. The vacuum cup type unit holder is, of course, easily and readily retractable by simply actuating the control mechanism 369. The elongate bar 399 is caused to move upward, and when this occurs the respective pairs of stiff elongate link members 403, 405 resume their retracted position attitude.

It will be appreciated by those skilled in the art that any ordinary type of unit of masonry may be used quite satisfactorily with the vacuum-cup type of unit holder. No unusual form or shape of unit of masonry is required or is necessary.

VIII.—*Vacuum-cup type of joint form board*

Figure 29:
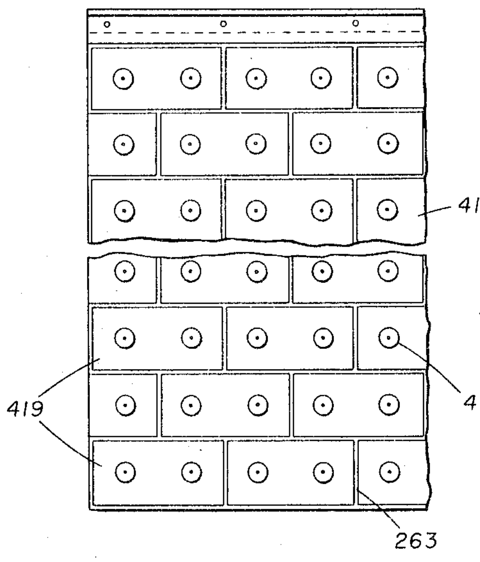
FIG. 29 is a schematic front elevational view of a vacuum cup type of joint form board.
Figure 30:
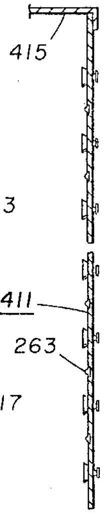
FIG. 30 is a schematic side elevational view of the joint form board of FIG. 29.

In FIGS. 29 and 30 there is delineated one form of a vacuum-cup type of joint form board 411 which comprises a plate member 413, a joint form board support angle 415, and a plurality of vacuum cups 373. The plate member 413 is structurally similar to the joint form board plate member 255 except that there are no holding plates 297 or housings 287, 289, but in each of the rectangular unit-shaped portions 419, which are formed by the joint forms 263, there are located a pair of spaced apart vacuum cups 373 (see FIG. 27). The vacuum cups 373, it will be noticed, are disposed in the plate member 413, in substantially the same manner, as in the plates 363, 365, which was described heretofore. That is, the vacuum cups 373 are arranged in horizontal rows and in vertical columns, as indicated in FIG. 30, so that at least two vacuum cups 373 will contact and hold each unit of masonry. The joint form board support angle 415, and the manner of attaching it to the plate member 413, is structurally the same as the support angle 277, and the bolt type of fasteners are similar to the fasteners 281 which are shown in FIG. 7 and which were described previously herein. And so a detailed description of the support angle 415 is not considered necessary.

IX.—*Mode of operation, vacuum-cup unit holder*

To understand the use of the vacuum-cup type of unit holder 361, reference may be made to FIGS. 1 and 27, as well as to the foregoing description of the mode of operation of the magnetic type of unit holder 39.

After the base plate 301 has been established on the foundation 307, in the manner described previously, a group of four vacuum-cup type of unit holders 361 may be erected on the base plate, expanded by moving the elongate bar 399 downward, and then their respective shelf angles 199 may be adjusted to a common horizontal level. Next, the unit spacer or grid 247 may be placed dependently on the shelf angles and the unit spaces thereof loaded as before. When the unit spaces (except the top horizontal row of spaces) have been loaded, a vacuum is impressed, in any suitable manner, upon a vacuum hose 417, or flexible tubing, to which each of the hoses 391 is connected. Whereupon, the individual units of masonry are urged into engagement with the vacuum cups 373 and are held in place by the force of atmospheric pressure against the surface of the unit of masonry. Thereafter, the shelf angles 199 may be lowered, the unit spacer or grid 247 may be removed, and the shelf angles raised again, as described previously.

The vacuum cup type of joint form board 411 may be placed in position, in a manner similar to the placement of the joint form board 253 described previously, and then maintained in such position by connecting each vacuum cup thereof to a vacuum hose or flexible tubing which may be similar to the vacuum hose 417. Of course, a vacuum may be impressed on the vacuum cup members 373 in any suitable manner. After completing the foregoing steps, the cementatory bonding substance or mortar, which has preferably the consistency of a grout, may be poured through the apertures 280 in the joint form board shelf angle 415, as described previously.

Now, then, after the cementatory bonding substance or mortar has set sufficiently, the vacuum cup type of unit holder, together with the vacuum cup type of joint form board, may be easily and readily removed. It is only necessary to break the vacuum on the unit holder and joint form board, and to retract the side bars 431, 433 of the unit holder by causing the elongate rod 399 to move upward. Thereupon, both the unit holder and the joint form board may be removed and reestablished at another location, in the manner previously described. It will be appreciated by those skilled in the art that, after the vacuum cup type of joint form board has been removed, it is not necessary to point up any of the voids in the mortar joints. This is for the reason that the vacuum cup type of joint form board has no joint form board holding plates which are similar to the plates 297 and housing 287, shown and described hereinbefore.

X.—*Mechanical unit holder*

In some applications it may be more advantageous to use a mechanical type of unit holder, rather than either the electromagnetic type or the vacuum-cup type of unit holders, shown and described hereinbefore. FIGS. 31 through 35 delineate a mechanical type of unit holder 419 which includes a slab-like main body portion 421, a plurality of mechanical unit holder rods 423, and a unit holder rods control mechanism 425.

The slab-like main body portion 421 is a rectangular shaped metal plate member which is about as long and as wide as the electromagnetic unit holder 39, shown and described previously; the thickness of the metal plate being about three-quarters of an inch. The plate, however, may be made of any suitable material and aluminum has been found to be preferable. On one surface of the main body portion 421 there are affixed a pair of the mechanical unit holder rods 423 which are disposed in spaced parallel arrangement; the distance between the longitudinal center lines of the unit holder rods 423 being about equal to the half-length of a unit of masonary. Each unit holder rod 423 is connected at the upper end to a yoke bar 427 which is connected to the piston rod 135 in the same manner and for the same purpose as the yoke bar 121. The unit holder rods control mechanism 425 is similar to the control mechanism 46 shown and described previously, except that there is a main piston assembly and only one side piston assembly. A shelf angle 199 is slidably fixed to the main body portion 421 and to the piston rod 193 in the same manner and for the same purpose as the shelf angle shown and described heretofore.

Each of the mechanical unit holder rods 423 comprises a main actuator or puller 429 (see FIG. 33); a pair of laterally movable side bars 431, 433; a back plate 435; a cover plate 437; and a resilient encapsulating membrane 439.

Figures 31, 32, 33, 34:
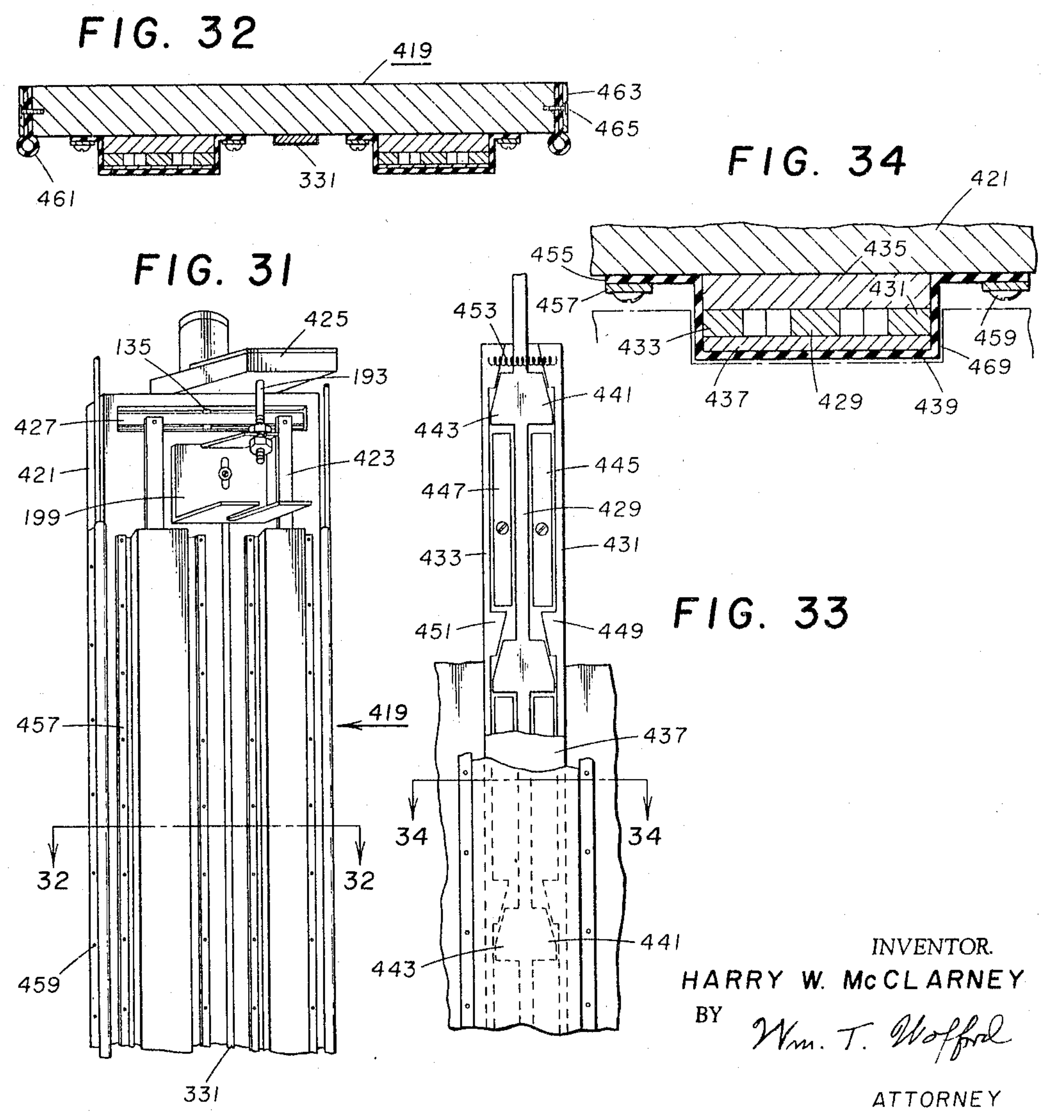
FIG. 31 is a partial schematic perspective view of a mechanical type of unit holder.
FIG. 32 is a sectional view taken at line 32—32 of FIG. 31.
FIG. 33 is a partial schematic elevational view of one element of a mechanical type unit holder.
FIG. 34 is a sectional view taken at line 34—34 of FIG. 33.

The main actuator or puller 429 is an elongate bar member having a generally rectangular cross sectional shape, on the sides of which there are integrally formed a plurality of oppositely arranged pairs of wedge plates 441, 443, which may be noticed by referring to FIG. 33. The main actuator or puller 429 is disposed to slide on the back plate 435 which may be fixed to the main body portion 421 in any suitable manner. The main actuator or puller 429 is disposed to slide between a plurality of pairs of oppositely arranged and spaced apart guide bars 445, 447 which are appropriately fastened to the back plate or integrally formed therewith. The side bars 431, 433 are elongate members which have generally rectangular cross sections and on which there are integrally formed a plurality of wedge plates 449, 451. These wedge plates are disposed and arranged to coact with the wedge plates 441, 443 on the main actuator or puller 429. A resilient bias means or spring member 453 is connected between the upper ends and the lower ends of the side bars 431, 433 for the purpose of providing continuous mutual coaction between the wedge plates. The cover plate 437 is disposed to cover the actuator or puller 429 and side bars, and to maintain them in proper place during operatively active and inactive periods. Each mechanical unit holder rod 423 is encapsulated in the resilient membrane or covering 439 which may be sealingly fixed to the main body portion in any suitable manner. One satisfactory way is to place each longitudinal edge 455 of the membrane between the body portion 421 and an elongate bar 457 which may be fastened to the main body portion by a plurality of spaced apart screw type fasteners 459, as shown in FIGS. 31 and 34. The upper and lower ends of the rods 423 may be similarly encapsulated, or in any other suitable manner.

Between the adjacent unit holder rods, a mason's scale 331 may, if desired, be attached to the main body portion in any suitable manner.

An inflatable resilient tube 461 may be disposed on each side of the main body portion 421 by means of an overlying elongate metal plate 463 and fixed to the back plate 435 by a plurality of fasteners 465, as may be noticed by referring to FIGS. 31 and 32. The purpose of these tubes 461 will be explained hereinafter.

Figure 35:
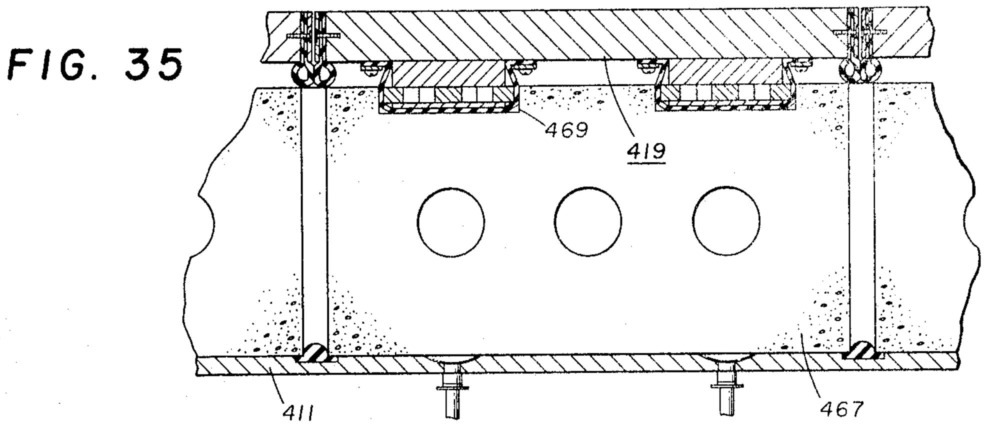
FIG. 35 is a schematic plan view, partly in section, of a mechanical type of unit holder as it appears in its operative position.

A unit of masonary which is suitable for use with the mechanical type of unit holder is shown, in plan view, in FIG. 35. It will be observed that such a unit of masonary 467 is not unlike the unit of masonary 217 shown in FIG. 10 and described hereinbefore, except that the mortise type of grooves 219, 221 in the unit 217 are replaced by a generally rectangular shaped groove 469 in the unit 467; and that the metal clips 223, 225 of the unit 217 are not required for use with the unit 467. In other respects, the unit 467 may be identical to the unit 217.

XI.—*Mechanical unit holder—Mode of operation*

To understand the mode of operation of the mechanical type of unit holder, reference may be made initially to FIG. 35. To begin with, a plurality of mechanical unit holders may be erected and maintained in the same manner as the unit holders described heretofore, and the unit spacer or grid may be suspended from the shelf angles 199 and similarly loaded with an appropriate type of units of masonary. Each unit of masonary is placed in the grid in such a manner that each groove 469 therein receives the encapsulated unit holder rod 423 which initially is in its retracted position. Thereafter, the mechanical rods control mechanism 425 may be actuated, in the manner previously described, so as to move the actuators or pullers 429 upward. This upward movement causes the wedge plates 441, 443 to coact with the wedge plates 449, 451, respectively, and to move the side bars 431, 433 laterally until they engage the sides of the grooves 469 in the unit. The resilient encapsulating medium 439 which, in a preferred embodiment, is a form of rubber, frictionally holds and maintains the units from slipping or moving out of position. When all of the units have been so positioned and are firmly supported by the mechanical unit holders, the grid 247 may be removed and the vacuum cup type of joint form boards 411 may be installed in the manner previously described. The next steps in the operation of the mechanical unit holder are to inflate the resilient tubes 461 and to pour the grout-like mortar through the apertures 280 in the joint form board angles. The resilient tubes of one unit holder about the resilient tubes of adjacent unit holders, as may be noticed by referring to FIG. 35, and thus prevent the escapement of the mortar between the unit holders. When the mortar has set sufficiently, the joint form board may be removed first, and then the mechanical unit holders may be retracted and removed. This is accomplished by first deflating the resilient tubes 461 and then actuating the control mechanism 425 so that the actuator or pullers 429 return to their initial position. The resilient bias means or springs 453 will then cause the side bars 431, 433 to return to their initial retracted position, or about where they are shown in FIG. 32.

It should be mentioned that the mechanical type of unit holder 419, which has just been described, may be adapted to hold and maintain the units of a double wall type of masonry simply by adding another pair of unit holder rods 423, a portion of the control mechanism 425, and a pair of resilient tubes 461, to the opposite vertical face of the main body portion 421. That is to say, mechanical type unit holder rods will be located on both sides of the main body portion and there will be a control mechanism to operate simultaneously both sets of rods.

XII.—*Pneumatic type of unit holder*

Figures 36, 40:
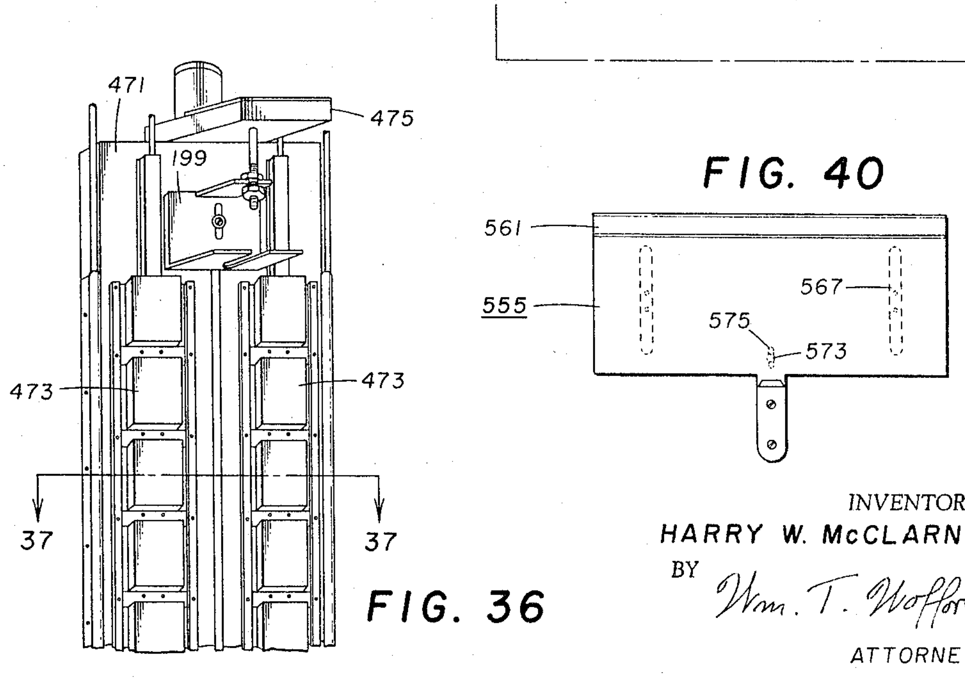
FIG. 36 is a perspective view of the upper portion of a pneumatic type of unit holder.
FIG. 40 is a plan view of a hand unit laying tool.

In FIG. 36 there is delineated a pneumatic type of unit holder which includes a main body portion 471, a plurality of pneumatic or fluid actuatable unit holders 473, a shelf angle 199, and a control mechanism 475 for the shelf angle.

The main body portion 471 is a rectangular shaped metal plate member which has substantially the same proportions as the main body portion 421 described previously. In one surface of the main body portion 471 there are a plurality of spaced apart rectangular shaped wells or sockets 477 (see FIG. 37) that are arranged in spaced apart generally vertical columns and in pairs in generally horizontal rows, as may be seen by referring to FIG. 36. In the side walls of each socket 477, there are a pair of oppositely disposed recesses 479 and in each recess there is a coil type spring 481 which abuts one face of a pair of unit engaging block members 483. Each unit engaging block member is disposed to be movable laterally in its respective slot and the major portion of each block member projects above or out from the surface of the main body portion 471. In the outer surfaces of each pair of block members there are opposed facing grooves 485 wherein there is disposed a rectangular plate member 487. The space within each socket which is between each respective pair of block members, is occupied by a portion of a resilient inflatable tubular member 489. The tubular member 489 extends from the topmost socket to the lowermost socket in each vertical column and it is inflatable for a purpose that will be presently described. The outwardly extending portion of each pair of block members 483 and the plate 487 are suitably encapsulated in a resilient covering or membrane 491 which may be sealingly affixed to the main body portion in the manner heretofore described in connection with the covering 439.

There is provided, also, the control mechanism 475 which includes a single shelf angle actuating piston and cylinder 59 and which is connected, in the manner previously described, to the shelf angle 199 slidably mounted on the main body portion 471. Likewise, there is provided, for the purpose described previously, on each longitudinal side of the main body portion 471 an inflatable tube similar to the tube 461.

XIII.—*Mode of operation—Pneumatic unit holder*

Figures 37, 39, 41:
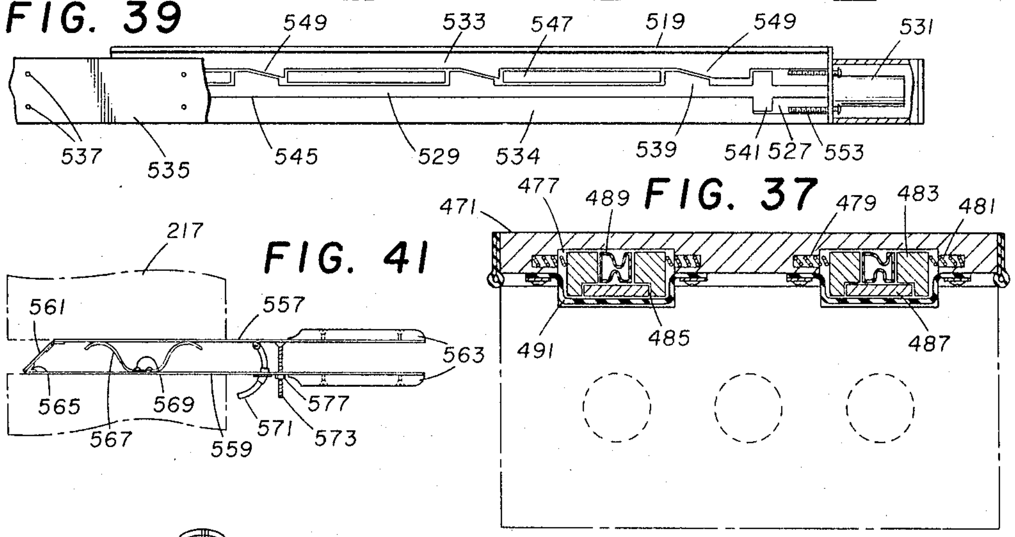
FIG. 37 is a sectional view taken along line 37—37 of FIG. 36.
FIG. 39 is a front elevational view, partly cut away, of the unit laying board of FIG. 38.
FIG. 41 is a side elevational view of the unit laying tool of FIG. 40.

To understand the mode of operation of the pneumatic type of unit holder, reference may be made to FIG. 37 and to the description of the mode of operation of the mechanical unit holder.

To begin with, a plurality of pneumatic unit holders may be erected and maintained in the same manner as the unit holders previously described, and the unit spacer or grid may be suspended from the shelf angles 199 and similarly loaded with an appropriate type of unit of masonry, which, in this instance, is the same type of unit used with the mechanical unit holder. Thereafter, the pneumatic unit holders may be activated by inflating the resilient tubular members 489. The inflated tubular member 489 causes the several pairs of block members 483 to move laterally in their respective slots against the springs 481. The edges of the block members, which are covered by the resilient covering or membrane 491, engage the sides of the grooves in each unit of masonry and frictionally hold and maintain the units from slipping or moving out of position. Thereafter, the grid may be removed, the joint form board installed, and the units united by pouring a grout-like mortar between the unit holders and the rear faces of the units. Later, when the mortar has set sufficiently, the joint form board, as well as the pneumatic unit holders may be removed and then reestablished as necessary to complete the section of masonry.

As was mentioned in connection with the mechanical type of unit holders, the pneumatic unit holder may be readily and easily adapted, if desired, to construct a double wall type of masonry. It is only necessary to install another pair of pneumatically actuatable rods and a shelf angle on the opposite face of the main body portion, and to replace the single piston type of control mechanism with one which has two cylinder and piston assemblies 59 or to add an additional single piston control mechanism.

XIV.—*Adhesive type of unit holder*

Figure 28:
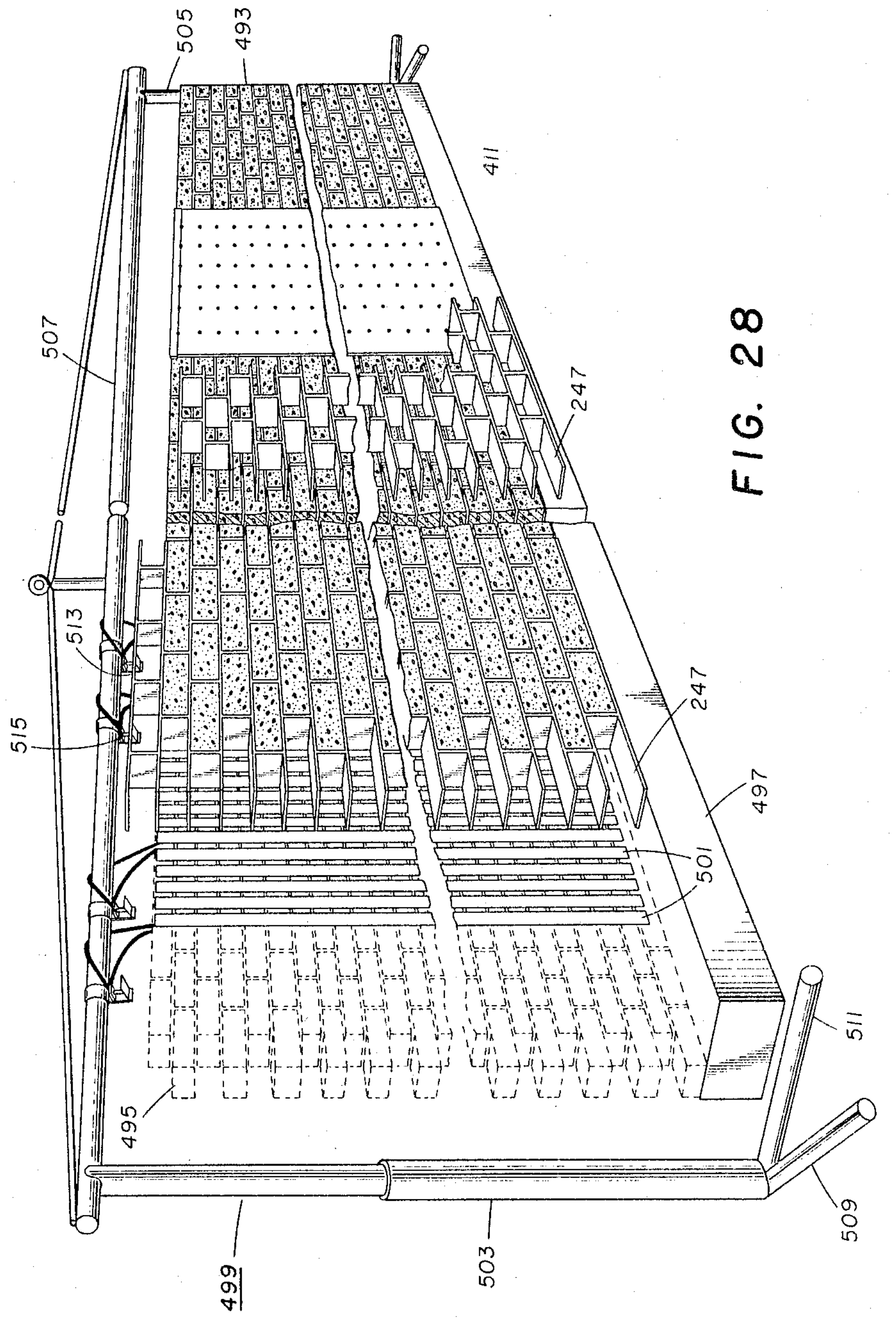
FIG. 28 is a schematic perspective view of another form of masonry constructed in accordance with a modified method and with the modified apparatus of my invention.

In FIG. 28 there is illustrated a method and apparatus for erecting a masonry type of veneer surface 493 on an existing masonry 495 by means of an adhesive type of unit holder.

Basically, the existing masonry 495 is supported on a foundation 497 which is wide enough at the top to support the added masonry type of veneer surface 493. The apparatus comprises a grid supporting structure 499, a plurality of lengths of double-surface coated adhesive strips 501, the usual grid 247, and the vacuum cup type of joint form board 411.

The grid supporting structure 499 comprises a pair of extendable telescopable upright columns 503, 505, and a truss type of structure 507 which is fixedly connected to the upper ends of the columns 503, 505. The lower end of each column has a pair of diverging bars or tubular members 509, 511 fixed thereto substantially at right angles to the axis of the column, so as to provide support against tipping. The length of the truss type structure 507 is somewhat longer than the foundation, as may be noticed by referring to FIG. 28. A plurality of shelf angles 513 are each connected to a cylinder and piston assembly 515 which, in turn, may be connected to the truss type of structure 507 in any appropriate manner.

The adhesive strips 501 include a paper or fabric or plastic base supporting medium for a coating of adhesive which is applied to both surfaces of the base medium. The adhesive is a rapidly drying compound that will adhere to masonry type surfaces and which will support units of masonry in the manner and for the purpose to be presently described. If desired, the adhesive material may be sprayed or brushed or otherwise applied on the existing wall or backing structure.

XV.—*Adhesive type unit holder—Mode of operation*

To understand the mode of operation of the adhesive type unit holder, reference may be made to FIG. 28. To begin with, the grid support structure 499 is erected and made plumb with respect to the existing masonry 495. Next, a plurality of adhesive strips 501 are applied to the surface of the existing masonry and they are disposed in a spaced parallel vertical arrangement, each strip being spaced from an adjacent strip a distance that is, preferably, about one-half the length of a unit of masonry. Successively, the following steps are accomplished: the grid 247 is suspended from the shelf angles 513 and then loaded with units of masonry. The units, of course, are pressed against the adhesive strips and are maintained in contact therewith until they are fully supported by the adhesive strips. Next, the shelf angles and grid are lowered, as described previously, about one-sixteenth of an inch and then the grid may be removed. The vacuum cup type of joint form board 411 is installed next, in the manner previously described, and the grout-like mortar or cememtatory bonding substance is poured into the space between the existing masonry and the newly erected units of masonry. When the mortar has set sufficiently the joint form board 411 may be removed and made ready for use in another location.

XVI.—*Pneumatic type manual unit laying board*

Figure 38:
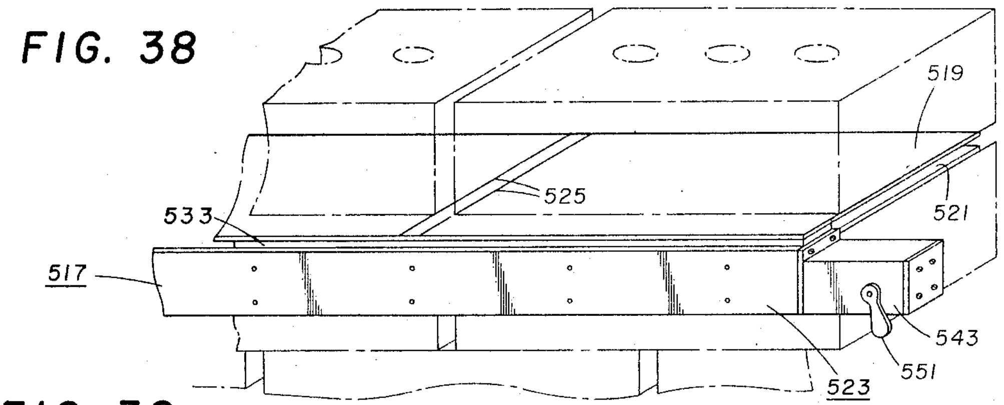
FIG. 38 is a perspective view of a portion of a pneumatically actuated unit laying board.

In FIGS. 38 and 39 there is delineated a pneumatic or fluid operated manual unit laying board 517 which includes a top unit laying plate 519, a bottom unit laying plate 521 and a top plate actuating mechanism 523.

The top unit laying plate 519 comprises a rectangular shaped plate of suitable non-magnetizable material, such as aluminum, on the upper surface of which there may be inscribed or marked, in any appropriate manner, a series of transverse unit spacing lines 525 which are arranged to correspond to the spacing and length of various size units of masonry. The bottom unit laying plate 521 is also a rectangular shaped plate of suitable non-magnetizable material, such as aluminum, but it has no lines to designate unit lengths or spacings that appear on the top plate 519. The top plate actuating mechanism 523 includes a back plate 527, an actuator rod 529, an actuator cylinder 531, a movable top bar 533, a bottom guide bar 534 which preferably is integrally formed with the lower edge portion of the back plate 527, and a front plate 535. The upper edge of the back plate is fixed to one of the longitudinal edge portions of the bottom unit laying plate 521 and depends therefrom at substantially a right angle, as may be noted by referring to FIG. 38. The front plate 535 is removably secured to the bottom guide bar 534 by suitable fasteners 537 and its purpose is to guide as well as to protect the top plate actuating mechanism. The actuator rod 529 comprises an elongate rectangular shaped bar which has a plurality of wedges 539 integrally formed on the upper edge thereof and a pair of rectangular stop or travel limiting blocks 541 adjacent the right or actuator end. The right end of the actuator rod 529 is also connected to the actuator cylinder and piston assembly 531, which is not unlike the cylinder and piston assembly 61, shown and described hereinbefore. The actuator cylinder 531 it will be noticed is enclosed within a suitable housing portion 543 in order to protect it from encrustation by mortar and from other physical damage while the unit laying board is being used. The actuator rod 529 is disposed to rest on and slide along a shelf 545 formed by the top edge of the bottom guide bar 534, while it is restrained to move only in a longitudinal direction by a plurality of guide bars 547, which are suitably fixed to the back plate 527. The movable top bar 533 is, also, an elongate rectangular bar on which there are integrally formed a plurality of wedges 549 that are disposed and arranged so as to coact with the wedges 539. The upper edge of the movable top bar 533 is fixedly connected to the longitudinal edge portion of the top unit laying plate 519 for a purpose that will be presently explained.

XVII.—*Pneumatic type manual unit laying board—Mode of operation*

To understand the mode of operation of the pneumatic type of manual unit laying board 517, reference may be made to FIGS. 38 and 39. One of the purposes of the unit laying board 517 is to provide another simple and convenient apparatus to arrange units of masonry in regular manner in association with one or more types of unit holding devices, shown and described herein. Consequently, it will be assumed, for the purposes of this description only, that the pneumatic type of manual unit laying board is being used in association with a plurality or a group (as noted hereinbefore) comprising four magnetic unit holders 39 (not shown). It will be assumed, also, that the magnets of the magnetic unit holders are presently energized. Then, to commence operations, the unit laying board is disposed on the supporting foundation 307, or on the top of any course of bricks already in place (the courses of units being laid in the same manner as described herein) so that the bottom unit laying plate 521 is contiguous with the top surface of the supporting foundation 307, or the top course of units, as the case may be. The top unit laying plate 519 should then be raised. This may be easily accomplished by simply manipulating the control lever 551 so as to cause the actuator cylinder and piston 531 to move the actuator rod 529 toward the right. The wedges 539 coacting with the wedges 549 will cause the top bar 533 and the top unit laying plate 519 to move upward. The distance the top plate moves upward should be adjusted to be substantially equal to the thickness of the horizontal joint between adjacent units of masonry in the courses of units. To achieve this result, a pair of travel limiting screws 553 are provided in the end of the actuating mechanism by means of which the amount of the upward movement of the top plate 519 may be determined. After the top plate is raised, a plurality of units of masonry may be positioned thereupon, in accordance with the appropriate line spacing 525, and the units moved toward the magnetic unit holders. When the metal plates of the units approach the energized magnets, they will be seized and thereafter held firmly in place, as described previously. When all units in the particular course have been seized, the top unit laying plate 519 may be returned to its initial position in contiguity with the bottom plate 521. This is easily accomplished by manipulating the control level 551 in the opposite direction. Whereupon, the actuator cylinder 531 moves the actuator rod 529 toward the left until the stop blocks 541 abut the edge of the shelf 545. The amount of downward movement of the top plate is sufficient to release the unit laying board and it may be withdrawn and then moved upward or to another location and reused in the same manner.

XVIII.—*Hand unit laying tool*

In FIGS. 40 and 41 there is depicted a hand operated unit laying tool 555 which includes a top plate 557, a bottom plate 559, and a connecting plate 561. The top plate 557 is a rectangular shaped plate which is approximately the size of a unit of masonry and which is made, preferably, of a non-magnetizable material, such as aluminum. The bottom plate 559 is similar to the top plate 557, and both the top and bottom plates have a handle device 563 fixed thereto along one longitudinal edge. The other longtiudinal edges of the top and bottom plates are hingedly connected to the longitudinal edges of the connecting plate 561 by means of hinges 565. A pair of curved leaf type springs 567 are fixed by means of rivets 569, or other suitable fasteners, to the inner surface of the bottom plate 559 and they are so formed that the curved portions thereof continuously contact the bottom surface of the top plate 557. A pair of arcuate guide bars 571 are pivotally connected to the top plate 557 and extend through appropriately sized openings in the bottom plate, as shown in FIG. 41. A single threaded stud or bolt 573 is fixedly connected to the top plate and projects downward and through a slotted opening 575 in the lower plate. A nut 577 is threaded on the bolt and may be selectively positioned thereon for the purpose of controlling the distance between the top and bottom plates.

XIX.—*Hand unit laying tool—Mode of operation*

To understand the mode of operation of the hand unit laying tool, reference may be made, when necessary, to the preceding description of the mode of operation of the pneumatic type manual unit laying board and to FIGS. 40 and 41.

The hand unit laying tool may also be used in association with one or more type of unit holders shown and described herein, but, for the purpose of this description only, it will be described in connection with a group of magnetic unit holders 39. After the magnets thereof have been energized, the hand unit laying tool is placed in position on the supporting foundation 307 or on the top course of units, which have been laid in accordance with the procedure to be presently described. The tool is so placed that the bottom plate 559 is resting on the top surface of the foundation, or course of units of masonry, and the handles 563 project away therefrom. The top plate 557 should be spaced from the bottom plate 559 a distance which is substantially equal to the width of the longitudinal mortar joint between adjacent courses of units (or the foundation and the first course). The spacing of the plates, of course, may be varied by moving the nut 577 to any selected position to achieve a preferred joint spacing. Thereafter a single unit of masonry may be placed on the top plate and then moved toward the magnetic unit holders. When the metal plate of the unit of masonry approaches the already energized magnets, it will be seized and the unit held firmly in position. The next step is to manipulate the handles 563 to bring them toward each other. In this way, the top plate 557 will pivot about the hinges 565 and will move toward the bottom plate 559, thereby freeing the tool 555. It may then be removed and relocated, in the same course, adjacent the unit that has just been positioned. It will be appreciated that the several units in any single course should be spaced laterally the same distance that the courses are spaced vertically so as to provide a uniform joint spacing.

XX.—*Adhesive type joint form board unit holder*

An adhesive type of joint form board unit holder 579 is shown in FIG. 42 and it includes a joint form board plate 581, which is not unlike the joint form board plate 255 shown and described hereinbefore, a joint form board angle 583 and a plurality of lengths of appropriately shaped joint forms 585 which may, if desired, be similar to the joint form 263, shown in FIG. 8 and previously described herein. Generally, the individual unit spaces 587 on the surface of the joint form board plate 581 are coated with an adhesive substance 589 (shown schematically in FIG. 42), which will cling to the edge surfaces of the units of masonry and temporarily hold them in position. Such an adhesive may be applied to the surface of the joint form board plate by spraying, or in the form of a double coated tape or film, or in any suitable form and manner.

XXI.—*Adhesive type joint form board unit holder—Mode of operation*

To understand the use of the adhesive type of joint form board unit holder, reference may be made to the preceding description of the mode of operation of the vacuum cup joint form board in association with the unit spacer or grid 247. After a unit spacer or grid has been loaded with units of masonry, the adhesive substance 589 may be applied to the surface of the joint form board. After this step, the board may be pressed against the exposed front surfaces of the units of masonry and maintained in contact position for a short period of time, or until the units are adhesively secured to the board, and it can be moved for further use. When such time arrives, the unit spacer or grid is removed leaving the units of masonry adhesively supported by the joint form board. Thereafter, the joint form board may be moved into a constructional position and maintained in fixed position while mortar is poured between the units to unite them into a common mass. After the mortar has set sufficiently, the joint form board may be removed and reused again. It should be clear, that the adhesive type of joint form board unit holder should be used in association with another joint form board similarly loaded with units of masonry or with an existing masonry, or with some other surface over and spaced from which the units of masonry are to be applied.

It is a feature of the present invention that in some embodiments magnetic forces are used to temporarily hold a plurality of units of masonry in position and in a selected arrangement until a cementatory bonding substance has been poured and has set sufficiently to unite the units of masonry into a common mass. These magnetic forces may be derived from either electromagnets or permanent magnets.

Another feature of the present invention is that a plurality of magnetic unit holder devices may be established and energized so as to firmly hold a plurality of units of masonry in a selected predetermined arrangement before, during and after the time when the cementatory bonding substance or mortar has been poured and until it has set sufficiently to permit removal of the participating magnetic unit holders.

Another feature of the present invention in accordance with one embodiment thereof is that each of the magnetic unit holders are mechanically expandable both in a lateral and in a transverse direction prior to use, and that each unit holder is mechanically and/or magnetically retractable after use so that the magnetic unit holder may then be readily and easily removed from its position.

Another feature of the present invention in accordance with one embodiment thereof is a magnetic unit holder system of constructing double wall type of masonries wherein: a plurality of spaced apart magnetic unit holders are arranged linearly in a group with such group being established on a supporting base plate fixed to a foundation or sill support; the magnetic unit holders are expanded laterally and transversely; a unit spacer or grid is suspended from the prealigned and leveled shelf angles of the magnetic unit holders; the electromagnet units of the magnetic unit holders are energized; the unit spacer or grid is loaded with appropriate units of masonry which are individually attractable to and fixable by the energized magnets; the shelf angles are lowered and the grid removed; a joint form board is placed in position adjoining the exposed front surfaces of the units of masonry and held in position by magnetizable holding plates attracted by the magnets; a grout-like cementatory bonding substance or mortar is poured between the front and back walls of the double-wall type of masonry; the magnets are de-energized after the bonding substance or mortar has set, and the magnetic unit holders are retracted; the joint form board is then removed; and the group of magnetic unit holders is removed from its established position.

Another feature of the present invention involves units of masonry especially adapted for use with the magnetic unit holder system. One form of such masonry unit is similar to a regular unit of masonry except that it has a plurality of spaced apart vertical grooves in the rear vertical face. The sides of the grooves slope slightly angularly so as to receive and frictionally hold a magnetizable U-shaped metal clip. The clips are inserted so that their outer surfaces are a fixed and predetermined distance from the front surface of the unit. Thus, it may happen that two or more units will vary slightly in width; however, the grooves are purposely made deep enough to allow for some adjustment in the depth of penetration of the clips. Another form of such masonry unit has wedge shaped metallic plates which are insertable into corresponding shaped grooves in the unit. Another form of such masonry unit has one or more magnetizable metal plates fixed and secured to the unit rear side surface by an adhesive substance, or in any other suitable manner.

Another feature of the present invention is the non-magnetizable unit spacer or grid which is used in conjunction with the magnetic unit holders and some of the other types of unit holders. Such a unit spacer or grid may be made of any non-magnetizable metal, such as aluminum, or it may be made of a durable and rugged plastics, or the like substances.

Another feature of the present invention is that the unit spacer or grid is removable from its initial position before the grout-like mortar is poured. Such a unit spacer or grid serves principally to align and position the units of masonry, but, after they are seized and held securely by the magnetic unit holder, the unit spacer or grid may be removed and reused in another location. It should be mentioned that the vertical and horizontal plates which form the unit spacer or grid need not necessarily be solid plates. If preferred, the plates may be perforated or, in some applications, the grid may comprise a plurality of slat-like or rod like members which are fixedly and securely held together in the same general grid form, as shown in the drawings.

Another feature of the present invention is the non-magnetizable joint form board which is used cojointly with the magnetic unit holders. Also, such a non-magnetizable joint form board may have a plurality of magnetizable holding plates which are attracted to the energized magnetic unit holders and hold the non-magnetizable joint form board in position.

Another feature of the present invention is the mortar joint extruder shown in FIG. 19. By means of such an instrument, the voids in the mortar joints, which are the result of the removal of the joint form board holding plates, are easily and quickly filled.

Another feature of the present invention is the vacuum cup type of unit holder. Such a unit holder is readily adapted to use ordinary types of units of masonry and it is not necessary that special units be used. It should be mentioned, also, that either a single or a double wall type of masonry may be constructed. Another feature of the present invention is the vacuum cup type of joint form board which is adaptable for use with various non-magnetic unit holder devices of the present invention. When it is considered that the holding means of the type of joint form board which is used with the magnetic unit holder may be a plurality of magnetizable holding plates, it is evident that in a non-magnetic system, other means for holding the joint form board must be provided. Hence, the vacuum cup type of joint form board of the present invention is readily and conveniently adaptable for use in conjunction with various forms of non-magnetic holders such as the mechanical rod-like unit holders; the pneumatic or fluid actuated rod-like unit holder; the vacuum cup type of unit holder; and the adhesive unit holder system, where such adhesive is applied to an existing wall or other type of structure. It should be recognized, too, that the vacuum cup type or joint form board may be used as a combined unit holder and joint form board in some applications.

Another feature of the present invention is the mechanical rod-like type of unit holder which is laterally expandable to engage the sides of a set of grooves in a unit of masonry. In this manner, the mechanical rod frictionally holds and supports a plurality of units which are not unlike the grooved units used in conjunction with the magnetic unit holder, except that it is not necessary to use magnetizable plate inserts in the grooves of the units used with the mechanical unit holder. A plurality of such mechanical unit holders may, of course, be suitably erected and loaded with units of masonry, whereupon, the vacuum cup type of joint form board may be applied and the units bonded into a common mass by pouring a cementatory bonding substance, or mortar, as described herein. It should be apparent, too, that another set of mechanical unit holders may be operatively mounted on the reverse side of the main body portion of the mechanical unit holder so that a double-wall type of masonry may be constructed using this type of apparatus.

Another feature of the present invention is the pneumatic or fluid actuated type of unit holder which is laterally expandable and which urges side bars to move into frictional holding engagement with the sides of a set of grooves in a unit of masonry. In this manner, the pneumatic or fluid actuated unit holder holds and supports a plurality of units of masonry which are not unlike the grooved units used in conjunction with the magnetic unit holder. As was mentioned previously in connection with the mechanical unit holders, no metal plates are inserted into the grooves of the units of masonry. Likewise, it should be apparent that another set of pneumatic or fluid actuated unit holders may be operatively installed on the reverse side of the main body portion so that a double-wall type of masonry may be constructed using this type of apparatus.

Another feature of the present invention is the adhesive tape or substance which may be applied to the surface of an existing wall, or other supporting structure, for the purpose of holding and supporting an arrangement of units of masonry. It will be appreciated that the adhesive substance may be applied in various forms such as a uniformly thick layer, a plurality of vertical or horizontal strips, a plurality of geometrical shaped figures, and in sundry other shapes. A grid may, of course, be used in association with a suitable support means for it. After the units are loaded into the grid and they are supportingly held by the adhesive, the grid may be removed and a vacuum cup type of joint form board may be installed. Thereafter, a cementatory bonding substance or mortar may be poured between the units to unite them into a common mass.

Another feature of the present invention is the adhesive coated joint form board unit holder comprising a joint form board plate which has the usual joint forms affixed thereto and which has an adhesive substance applied to the surface of the unit-shaped spaces between the joint forms. Of course, the adhesive may be applied as mentioned before in various ways such as in the form of a uniform coating, or a plurality of double surface adhesive coated strips in each space, or in a single double surface adhesive coated strip which is the size of one space. Those skilled in the art will recognize, also, that sundry other forms of adhesive media may be used in conjunction with this form of joint form board unit holder.

Another feature of the present invention is the high degree of uniformity in a masonry constructed in accordance with the principles set forth hereinbefore. After the unit holders have been aligned and plumbed, the units of masonry will be positively aligned with respect to both their bottom and their rear faces. This is easily and quickly accomplished when using the apparatus of the present invention. The shelf angles of the several unit holders may be leveled and then the grid structure, suspending therefrom, will also be level, as well as plumb. Now, since the distance between the rear surface of the metallic plate insert, or the bottom of the grooves holding the inserts, and the front surface of the unit is substantially constant, the positive alignment of the metallic plates, or the bottom of the grooves, abutting the unit holder surfaces will produce positive alignment of the front faces also. Also, it is clear that the units will be level since their bottom surfaces rest on the horizontal level plates of the grid structure.

Another feature of the present invention is the relative simplicity of practicing the system for constructing masonries and the speed with which they may be constructed. It is evident that it takes considerably longer time to lay a certain number of units by hand than it does to load the same number of units into an erected grid structure, and then to install the joint form board and pour the mortar slurry in the manner described herein.

Another feature of the present invention is that a minimum of tooling and pointing or patching-up is required after the apparatus of the present invention is removed from a particular location. The apparatus of the present invention forms the proper shape of joint and it is only necessary, when the magnetic unit holders are used, to fill the void joint spaces occupied by the joint form holding plates and these may be quickly and easily filled by using the mortar joint extruder apparatus in the manner described herein.

Another feature of the present invention is that the initial capital investment for the apparatus of the present invention is not excessive, but is entirely reasonable considering the many features and advantages that accrue therefrom.

Another feature of the present invention is that the apparatus thereof is simple to use and that it will produce a level and plumb masonry with all units thereof properly aligned.

Another feature of the present invention is the overall economy in labor costs that result from use of the apparatus and methods herein described. It is evident, then, that fewer men are required to construct a masonry using the apparatus and methods of the present invention than are required to construct the same masonry using the customary manual unit laying methods and equipment. Furthermore, it is evident that using the methods and apparatus of the present invention is much faster than using customary methods and apparatus. And so, there is a considerable over-all saving in the total number of manhours required.

Another feature of the present invention is that the corners of a wall-type masonry may be constructed much more quickly and more efficiently than by using present known methods and apparatus.

Another feature of the present invention is the saving in time and labor which results from the use of the unit spacer or grid shown and described herein. The open type of grid is readily accessible to receive units from either side, but particularly from the front side.

Another feature of the present invention is the versatility of the unit spacer or grid device thereof. It is clear that it may be made in a variety of ways and the unit spaces thereof may be arranged to suit any particular design or pattern. The units, when loaded into the grid spaces, of course, assume the same design or pattern.

The foreging disclosure and the showings made in the drawings are merely illustrative of the principles of this invention and are not to be interpreted in a limiting sense.

I claim:

1. Apparatus for constructing a masonry panel section made up of a plurality of units of masonry and a cementatory bonding substance capable of uniting said units into a common mass, said apparatus comprising:

(a) at least one magnetizable element affixed to a vertical surface portion of each such unit of masonry;
(b) a support structure;
(c) removable unit positioner means for disposing said units initially in predetermined spaced alignment, as in a panel, and adjacent said support structure; and
(d) magnetic means incorporated with said support structure for attracting said magnetizable elements of said plurality of units of masonry and maintaining said units in said predetermined spaced alignment after removal of said unit positioner means and during the pouring and setting of said cementatory bonding substance.

2. Apparatus for constructing a masonry panel section made up of a plurality of units of masonry and a cementatory bonding substance capable of uniting said units into a common mass, said apparatus comprising:

(a) a support structure;
(b) removable unit positioner means for disposing said units initially in predetermined spaced alignment, as in a panel, and adjacent said support structure;
(c) vacuum cup means incorporated with said support structure and including a plurality of vacuum cups with one or more of said vacuum cups engaging a vertical face of each of said units, with each said vacuum cup having an aperture for communication with a vacuum source so as to maintain said units in said predetermined spaced alignment after removal of said unit positioner means and during the pouring and setting of said cementatory bonding substance.

3. Apparatus for constructing a masonry panel section made up of a plurality of units of masonry and a cementatory bonding substance capable of uniting said units into a common mass, said apparatus comprising:

(a) a joint form board including a plate member;
(b) said plate member having therein a plurality of apertures each merging with a respective recess in the surface of said plate;
(c) a vacuum cup disposed in each said recess with the larger end of said vacuum cup received by said respective recess and with each said vacuum cup having an aperture for communication with a vacuum source;
(d) removale unit positioner means for disposing said units initially in predetermined spaced alignment, as in a panel, and adjacent said joint form board;
(e) said vacuum cups being disposed such that each masonry unit is engageable by at least one vacuum cup, so as to hold and maintain said units of masonry in said predetermined alignment after removal of said unit positioner means and during the pouring and setting of said cementatory bonding substance.

4. A unit holder apparatus for use in constructing a masonry including a plurality of units of masonry and a cementatory bonding substance capable of uniting said units into a common mass, said apparatus comprising:

(a) a first body portion having a front face and a rear face;
(b) a plurality of electromagnets fixedly mounted and arranged in spaced apart relation on said first body portion and having their faces disposed in a first plane;
(c) a second body portion having a front face and a rear face and disposed in a first position relative to said first body portion with its rear face adjacent the rear face of said first body portion;
(d) a plurality of electromagnets fixedly mounted and arranged in spaced apart relation on said second body portion and having their faces disposed in a second plane;
(e) means for moving said body portions relative to each other to a second position, so as to increase the distance between said rear faces, and maintaining same in second position;
(f) means for energizing and de-energizing said electromagnets; and
(g) means for retracting said body portions from said second position to said first position.

5. A unit holder apparatus for use in constructing a masonry including a plurality of units of masonry and a cementatory bonding substance capable of uniting said units into a common mass, said apparatus comprising:

(a) a first body portion having a front face and a rear face;
(b) a plurality of electromagnets fixedly mounted and arranged in spaced apart relation on said body portion and having their faces disposed in a first plane;
(c) a second body portion having a front face and a rear face and disposed in a first position relative to said first body portion with its rear face adjacent the rear face of said first body portion;
(d) a plurality of electromagnets having their faces disposed in a second plane and fixedly mounted and arranged in spaced apart relation on said second body portion and so as to each be located in substantially opposed coaxial relation with a respective electromagnet mounted on said first body portion;
(e) means for moving said body portions relative to each other to a second position so as to increase the distance between said rear faces; and for retracting said body portions to said first position, said means including means for energizing respective oppositely disposed electromagnets to selectively either attract or repel each other.

6. A unit holder apparatus for use in constructing a masonry including a plurality of units of masonry and a cementatory bonding substance capable of uniting said units into a comon mass, said apparatus comprising:

(a) a rectangular shaped fixed first body portion;
(b) a plurality of electromagnets fixedly supported by said first body portion and arranged thereon in spaced apart relation;

(c) a rectangular shaped movable second body portion disposed in a first position adjacent and substantially parallel to said fixed first body portion;

(d) a plurality of electromagnets fixedly supported by said second body portion and arranged thereon in spaced apart relation, each of the electromagnets supported on said second body portion being located in substantially opposed coaxial relation with a respective electromagnet supported on said first body portion;

(e) means for moving said second body portion from said first position to a second position spaced therefrom and maintaining said second body portion thereat, the said electromagnets being and remaining substantially in opposed coaxial relation;

(f) a first pair of rectangular shaped side members each being mounted on one longitudinal side of said first body portion and being laterally extendable with respect to said first body portion;

(g) a second pair of rectangular shaped side members each being mounted on one longitudinal side of said second body portion and being laterally extendable with respect to said second body portion;

(h) means engaging each of said first and second pairs of said side members and being capable of laterally extending simultaneously said side members from a first position to a second position;

(j) resilient bias means engaging each said side member and being capable of retracting same to its respective initial position; and (k) resilient impervious means encapsulating each said side members.

7. A unit holder apparatus for use in constructing a masonry including a plurality of units of masonry and a cementatory bonding substance capable of uniting said units into a common mass, said apparatus comprising:

(a) a first body portion having a front face and a rear face;

(b) a plurality of electromagnets fixedly mounted and arranged in spaced apart relation on said first body portion;

(c) a second body portion having a front face and a rear face and disposed in a first position relative to said first body portion with its rear face adjacent the rear face of said first body portion;

(d) a plurality of electromagnets fixedly mounted and arranged in spaced apart relation on said second body portion;

(e) means for moving said body portions relative to each other to a second position, so as to increase the distance between said rear faces, and maintaining same in second position;

(f) means for energizing and de-energizing said electromagnets;

(g) means for retracting said body portions from second position to said first position;

(h) first grid structure support means secured to the front face of said first body portion;

(i) second grid structure support means secured to the front face of said second body portion; and (j) means for selectively and independently moving said first and second grid structure support means vertically with respect to their respective body portions.

8. Apparatus for constructing a masonry including a plurality of units of masonry having magnetizable elements and a cementatory bonding substance capable of uniting said units into a common mass, said apparatus comprising:

(a) a plurality of masonry unit holders disposed in serial upright side by side relation;

(b) a plurality of magnets carried by each said unit holder and disposed to contact magnetizable elements of respective masonry units when said units are arranged in predetermined spaced relation;

(c) a non-magnetizable open-faced grid structure having masonry unit receiving compartments disposed in predetermined spaced relation such that said units, when received in said compartments are arranged in said predetermined spaced relation;

(d) means for supporting said grid structure so that magnetizable elements of masonry units received by same may contact respective said magnets; and (e) means for reducing the elevation of said support structure, after said magnets have engaged said magnetizable elements sufficiently to free said grid structure from contact with the bottom faces of said masonry units.

9. A unit holder apparatus for use in constructing a masonry including a plurality of units of masonry each having a slot formed in a vertical face thereof and a cementatory bonding substance capable of uniting said units into a common mass, said apparatus comprising:

(a) an elongate body portion;

(b) a plurality of pairs of adjacent spaced apart guide bars affixed to one surface of said body portion;

(c) an elongate reciprocable rod disposed between said adjacent pairs of guide bars, said elongate rod having affixed thereon a plurality of pairs of wedge-shaped members disposed in spaced apart relation, each pair of wedge-shaped members being arranged oppositely on said elongate rod;

(d) a pair of spaced apart elongate side bars each having affixed thereon a plurality of wedge-shaped members disposed in spaced apart relation, with each such wedge-shaped member engaging and coacting with a respective wedge member on said elongate rod to expand said side bars for coaction with respective slots of said units; and (e) means maintaining the wedge-shaped members on said side bars in engaging coactive relation with the wedge-shaped members on said elongate rod.

10. Apparatus for constructing a masonry including a plurality of units of masonry each having a depression formed in a vertical face thereof and a cementatory bonding substance capable of uniting said units into a common mass, said apparatus comprising:

(a) a plurality of masonry unit holders disposed in serial upright side by side relation;

(b) each said unit holder comprising an expandable rod, with means on said rod for engaging respective depressions of respective said units when said rod is expanded, so as to maintain said units in predetermined spaced alignment during the pouring and setting of said cementatory bonding substance;

(c) an open-faced grid structure having masonry unit receiving compartments in said predetermined spaced relation;

(d) means for supporting said grid structure so that respective depressions of said masonry units are received by said rod respective slot engaging means;

(e) means for expanding said rods; and (f) means for reducing the elevation of said support structure, after said rods have been expanded, sufficiently to free said grid structure from contact with the bottom faces of said masonry units.

11. Apparatus for constructing a masonry including a plurality of units of masonry each having a depression formed in a vertical face thereof and a cementatory bonding substance capable of uniting said units into a common mass, said apparatus comprising:

(a) a support structure;

(b) an expandable rod incorporated with said support structure;

(c) means on said rod for engaging respective depressions of said units when said rod is expanded, so as to maintain said units in predetermined spaced alignment during the pouring and setting of said cementatory bonding substance; and
(d) means for expanding said rod.

12. A unit holder apparatus for use in constructing a masonry including a plurality of units of masonry each having a slot formed in a vertical face thereof and a cementatory bonding substance capable of uniting of said units into a common mass, said apparatus comprising:
(a) an elongate main body portion having therein a plurality of sockets wherein there is at least one recess in each of the opposed longitudinal walls thereof;
(b) first and second spaced apart members disposed partly in each said socket and partly extending therefrom, the outer surface of each said member having therein a groove, with the grooves disposed in opposed facing relation;
(c) an elongate bar disposed with its longitudinal edge portions in said grooves;
(d) a first elongate resilient inflatable member a portion of which is disposed in each said socket between said first and second grooved members and between the bottom surface of said socket and said elongate bar;
(e) resilient bias means disposed in each said recess and engaging said first and second grooved members; and
(f) a resilient impervious covering encapsulating said grooved members and said elongate bar of each said socket.

13. A unit holder apparatus for use in constructing a masonry including a plurality of units of masonry each having a slot formed in a vertical face thereof and a cementatory bonding substance capable of uniting of said units into a common mass, said apparatus comprising:
(a) an elongate main body portion;
(b) a plurality of pairs of spaced apart bar segments mounted on said main body portion, each pair of bars being capable of lateral movement with respect to said main body portion; and
(c) fluid actuated means engaging each said pair of bar segments and causing said pairs of bar segments to move laterally, so as to effect engagement of portions of said apparatus with respective slots of said units.

14. Apparatus for constructing a masonry including a plurality of units of masonry and a cementatory bonding substance capable of uniting said units into a common mass, said apparatus comprising:
(a) a plurality of masonry unit holders disposed in serial upright side by side relation;
(b) each said unit holder comprising vacuum cup means for engaging a vertical face of each of a plurality of said units and capable of being activated so as to maintain said units in predetermined spaced alignment during the pouring and setting of said cementatory bonding substance;
(c) an open-faced grid structure having masonry unit receiving compartments disposed in said predetermined spaced relationship;
(d) means for supporting said grid structure so that respective said masonry units are engaged by respective said vacuum cup means;
(e) means for activating vacuum cup means; and
(f) means for reducing the elevation of said support structure, after said vacuum cup means has been activated sufficiently to free said grid structure from contact with bottom faces of said masonry units.

References Cited by the Examiner

UNITED STATES PATENTS

| | | | |
|---|---|---|---|
| 1,809,504 | 6/1931 | Carvel | 264—35 |
| 1,968,189 | 7/1934 | Bartels | 264—261 |
| 2,453,582 | 11/1948 | Morgan | 317—159 |
| 2,672,664 | 3/1954 | Sudziarski. | |
| 3,026,575 | 3/1962 | Lusher et al. | 264—261 |
| 3,064,166 | 11/1962 | Robiette | 317—163 |
| 3,154,833 | 11/1964 | Kimball | 317—159 |
| 3,222,749 | 12/1965 | Haas | 25—121 |

FOREIGN PATENTS

| | | |
|---|---|---|
| 176,665 | 11/1953 | Austria. |
| 476,210 | 8/1951 | Canada. |
| 868,491 | 5/1961 | Great Britain. |

J. SPENCER OVERHOLSER, *Primary Examiner.*

G. A. KAP, R. D. BALDWIN, *Assistant Examiners.*